(12) United States Patent
Senatore et al.

(10) Patent No.: US 8,708,486 B2
(45) Date of Patent: Apr. 29, 2014

(54) FLUID FILLED LENSES AND MECHANISMS OF INFLATION THEREOF

(75) Inventors: Daniel Senatore, New York, NY (US); Matthew Wallace Peterson, San Francisco, CA (US); Jonathan Downing, Belmont, CA (US); Amitava Gupta, Roanoke, VA (US); William Egan, Jackson, WY (US); Lisa Nibauer, Short Hills, NJ (US); Frank Stangota, Bridgewater, NJ (US); Bruce Decker, Solebury, PA (US); Thomas M. McGuire, Princeton, NJ (US); Urban Schnell, Münchenbuchsee (CH); Karim Haroud, Chavannes sur Moudon (CH); Pascal Loser, Bern (CH)

(73) Assignee: Adlens Beacon, Inc., Iselin, NJ (US)

( * ) Notice: Subject to any disclaimer, the term of this patent is extended or adjusted under 35 U.S.C. 154(b) by 0 days.

(21) Appl. No.: 13/000,887

(22) PCT Filed: Oct. 15, 2010

(86) PCT No.: PCT/US2010/052902
§ 371 (c)(1),
(2), (4) Date: Jun. 18, 2012

(87) PCT Pub. No.: WO2011/047305
PCT Pub. Date: Apr. 21, 2011

(65) Prior Publication Data
US 2012/0274894 A1 Nov. 1, 2012

Related U.S. Application Data

(63) Continuation of application No. 12/904,720, filed on Oct. 14, 2010, now abandoned.

(60) Provisional application No. 61/251,819, filed on Oct. 15, 2009.

(51) Int. Cl.
*G02C 7/00* (2006.01)

(52) U.S. Cl.
USPC .................................... 351/159.68

(58) Field of Classification Search
USPC .............. 351/159.68, 159.01, 159.04, 41, 82, 351/111, 121; 359/665, 666
See application file for complete search history.

(56) References Cited

U.S. PATENT DOCUMENTS 2,576,581 A * 11/1951 Edwards .......................... 351/41
2,836,101 A     5/1958 De Swart
(Continued)

FOREIGN PATENT DOCUMENTS

WO    WO 2008/063442 A1    5/2008

OTHER PUBLICATIONS

Borish, I.M., Clinical Refraction, 3rd Edition, Chapter 26 (pp. 1051-1113), The Professional Press, Inc., Chicago (1970), 65 pages.

(Continued)

*Primary Examiner* — Scott J Sugarman
*Assistant Examiner* — Mustak Choudhury
(74) *Attorney, Agent, or Firm* — Sterne, Kessler, Goldstein & Fox P.L.L.C.

(57) ABSTRACT

An actuator for a fluid-filled lens including a housing having a first and a second end; a reservoir disposed within the housing. In an embodiment, a slider is slidingly disposed within the housing and disposed adjacent to the reservoir. In an embodiment, the actuator further includes a compression arm having a first end that is fixed and a second end that is not fixed, wherein the compression arm is disposed adjacent to the reservoir. Sliding the slider from one end of the housing to the other causes the slider to push the second end of the compression arm so as to compress the reservoir. In an embodiment, the slider includes a first end having a wedge shape configured to compress the reservoir. Sliding of the slider from one end of the housing to the other causes the first end of the slider to compress the reservoir.

16 Claims, 29 Drawing Sheets

(56) References Cited

U.S. PATENT DOCUMENTS

| | | |
|---|---|---|
| 2,976,766 A | 3/1961 | Bianchi |
| 3,598,479 A | 8/1971 | Wright |
| 3,614,215 A | 10/1971 | Mackta |
| 4,181,408 A | 1/1980 | Senders |
| 4,477,158 A | 10/1984 | Pollock et al. |
| 4,890,903 A | 1/1990 | Treisman et al. |
| 4,913,536 A | 4/1990 | Barnea |
| 5,080,476 A | 1/1992 | Monin |
| 5,138,494 A | 8/1992 | Kurtin |
| 5,182,585 A | 1/1993 | Stoner |
| 5,229,885 A | 7/1993 | Quaglia |
| 5,371,629 A | 12/1994 | Kurtin et al. |
| 5,440,357 A | 8/1995 | Quaglia |
| 5,515,203 A | 5/1996 | Nye |
| 5,563,528 A | 10/1996 | Diba et al. |
| 5,574,598 A | 11/1996 | Koumura et al. |
| 5,636,368 A | 6/1997 | Harrison et al. |
| 5,668,620 A | 9/1997 | Kurtin et al. |
| 5,684,637 A | 11/1997 | Floyd |
| 5,719,397 A | 2/1998 | Hallett et al. |
| 5,731,909 A | 3/1998 | Schachar |
| 5,739,959 A | 4/1998 | Quaglia |
| 5,774,273 A | 6/1998 | Bornhorst |
| 5,790,882 A | 8/1998 | Silver et al. |
| 5,900,921 A | 5/1999 | Min |
| 5,952,846 A | 9/1999 | Silver |
| 5,956,183 A | 9/1999 | Epstein et al. |
| 5,963,048 A | 10/1999 | Harrison et al. |
| 5,973,852 A | 10/1999 | Task |
| 5,999,328 A | 12/1999 | Kurtin et al. |
| 6,040,947 A | 3/2000 | Kurtin et al. |
| 6,053,610 A | 4/2000 | Kurtin et al. |
| 6,069,742 A | 5/2000 | Silver |
| 6,091,892 A | 7/2000 | Xue et al. |
| 6,188,525 B1 | 2/2001 | Silver |
| 6,246,528 B1 | 6/2001 | Schachar |
| 6,493,151 B2 | 12/2002 | Schachar |
| 6,552,860 B1 | 4/2003 | Alden |
| 6,618,208 B1 | 9/2003 | Silver |
| 6,626,532 B1 | 9/2003 | Nishioka et al. |
| 6,715,876 B2 | 4/2004 | Floyd |
| 6,836,374 B2 | 12/2004 | Esch et al. |
| 6,930,838 B2 | 8/2005 | Schachar |
| 6,992,843 B2 | 1/2006 | Juhala |
| 7,068,439 B2 | 6/2006 | Esch et al. |
| 7,085,065 B2 | 8/2006 | Silver |
| 7,142,369 B2 | 11/2006 | Wu et al. |
| 7,256,943 B1 | 8/2007 | Kobrin et al. |
| 7,261,736 B1 | 8/2007 | Azar |
| 7,324,287 B1 | 1/2008 | Gollier |
| 7,325,922 B2 | 2/2008 | Spivey |
| 7,338,159 B2 | 3/2008 | Spivey |
| 7,342,733 B2 | 3/2008 | Takei |
| 7,369,321 B1 | 5/2008 | Ren et al. |
| 7,382,544 B2 | 6/2008 | Cernasov |
| 7,423,811 B2 | 9/2008 | Silver |
| 7,440,193 B2 | 10/2008 | Gunasekaran et al. |
| 7,453,646 B2 | 11/2008 | Lo |
| 7,475,985 B2 | 1/2009 | Blum et al. |
| 7,580,195 B2 | 8/2009 | Choi et al. |
| 7,580,197 B2 | 8/2009 | Omura et al. |
| 7,594,726 B2 | 9/2009 | Silver |
| 7,604,349 B2 | 10/2009 | Blum et al. |
| 2004/0240076 A1 | 12/2004 | Silver |
| 2005/0140922 A1 | 6/2005 | Bekerman et al. |
| 2006/0066808 A1 | 3/2006 | Blum et al. |
| 2006/0077562 A1 | 4/2006 | Silver |
| 2006/0164731 A1 | 7/2006 | Wu et al. |
| 2006/0245071 A1 | 11/2006 | George et al. |
| 2006/0250699 A1 | 11/2006 | Silver |
| 2007/0030573 A1 | 2/2007 | Batchko et al. |
| 2007/0211207 A1 | 9/2007 | Lo et al. |
| 2008/0002150 A1 | 1/2008 | Blum et al. |
| 2008/0007689 A1 | 1/2008 | Silver |
| 2008/0008600 A1* | 1/2008 | Silver ........................... 417/217 |
| 2008/0019015 A1 | 1/2008 | Fernandez et al. |
| 2008/0084532 A1 | 4/2008 | Kurtin |
| 2008/0112059 A1 | 5/2008 | Choi et al. |
| 2008/0218873 A1 | 9/2008 | Batchko et al. |
| 2008/0231963 A1 | 9/2008 | Batchko et al. |
| 2008/0285143 A1 | 11/2008 | Batchko et al. |
| 2008/0316587 A1 | 12/2008 | Tijburg et al. |
| 2009/0021843 A1 | 1/2009 | Obrebski et al. |
| 2009/0052049 A1 | 2/2009 | Batchko et al. |
| 2009/0086331 A1 | 4/2009 | Gunasekaran et al. |
| 2009/0116118 A1 | 5/2009 | Frazier et al. |
| 2009/0128922 A1 | 5/2009 | Justis et al. |
| 2009/0195882 A1 | 8/2009 | Bolle et al. |
| 2009/0213471 A1 | 8/2009 | Silver et al. |
| 2009/0251792 A1 | 10/2009 | Suzuki et al. |
| 2010/0045930 A1 | 2/2010 | Silver et al. |
| 2010/0053543 A1 | 3/2010 | Silver et al. |
| 2010/0208194 A1 | 8/2010 | Gupta et al. |
| 2010/0208195 A1 | 8/2010 | Gupta et al. |

OTHER PUBLICATIONS

Jalie, M., The Principles of Ophthalmic Lenses, 4th Edition, Chapter 18 (pp. 413-468), The Association of Dispensing Opticians, Hazell Watson & Viney Limited, London (1984), 58 pages.

Markoff, J., "Scientists At Work: Stephen Kurtin—Making Eyeglasses That Let Wearers Change Focus on the Fly," The New York Times (Aug. 4, 2009), 3 pages.

Tang, S.K.Y. et al., "Dynamically Reconfigurable Liquid-Core Liquid-Cladding Lens in a Microfluidic Channel," Lab on a Chip, vol. 8, No. 3, p. 395-401 (Mar. 2008), 8 pages.

International Search Report and Written Opinion, dated Dec. 10, 2010, for PCT Appl. No. PCT/US 10/52902, 12 pages.

Gupta, A. et al., U.S. Appl. No. 12/579,203, filed Oct. 14, 2009, entitled "Aspheric Fluid Filled Lens Optic,".

Gupta, A. et al., U.S. Appl. No. 12/848,910, filed Aug. 2, 2010, entitled "Non-Round Fluid Filled Lens Optic,".

Gupta, A. et al., U.S. Appl. No. 12/855,465, filed Aug. 12, 2010, entitled "Fluid-Filled Lenses and their Opthalmic Applications,".

Gupta, A. et al., U.S. Appl. No. 12/904,736, filed Oct. 14, 2010, entitled "Fluid Filled Lens Reservoir System and Manufacturing Method of the Reservoir System,".

Senatore, D. et al., U.S. Appl. No. 12/904,769, filed Oct. 14, 2010, entitled "Hinge Mechanism for a Fluid Filled Lens Assembly,".

Tang et al., "Dynamically Reconfigurable Liquid-Core Liquid-Cladding Lens in a Mircofluidic Channel"; Lab on a Chip; vol. 8; No. 3; pp. 395-401 (XP055050076).

European Search Report Based on Application No. EP 10824194.4, dated Jan. 30, 2013.

* cited by examiner

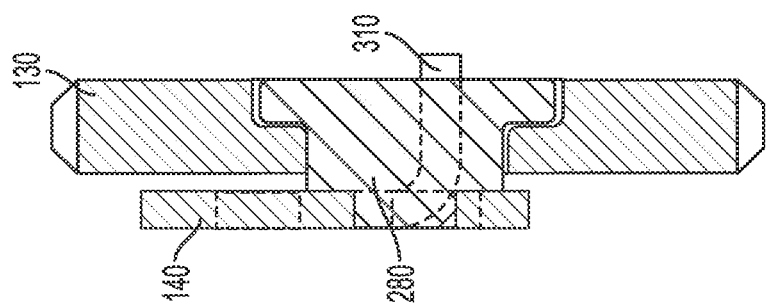
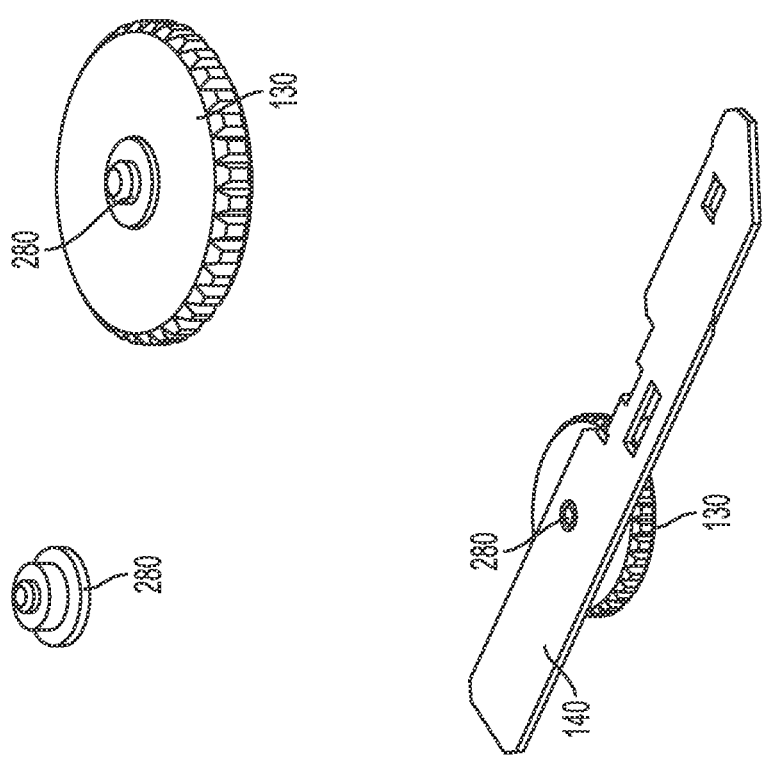
FIG. 3

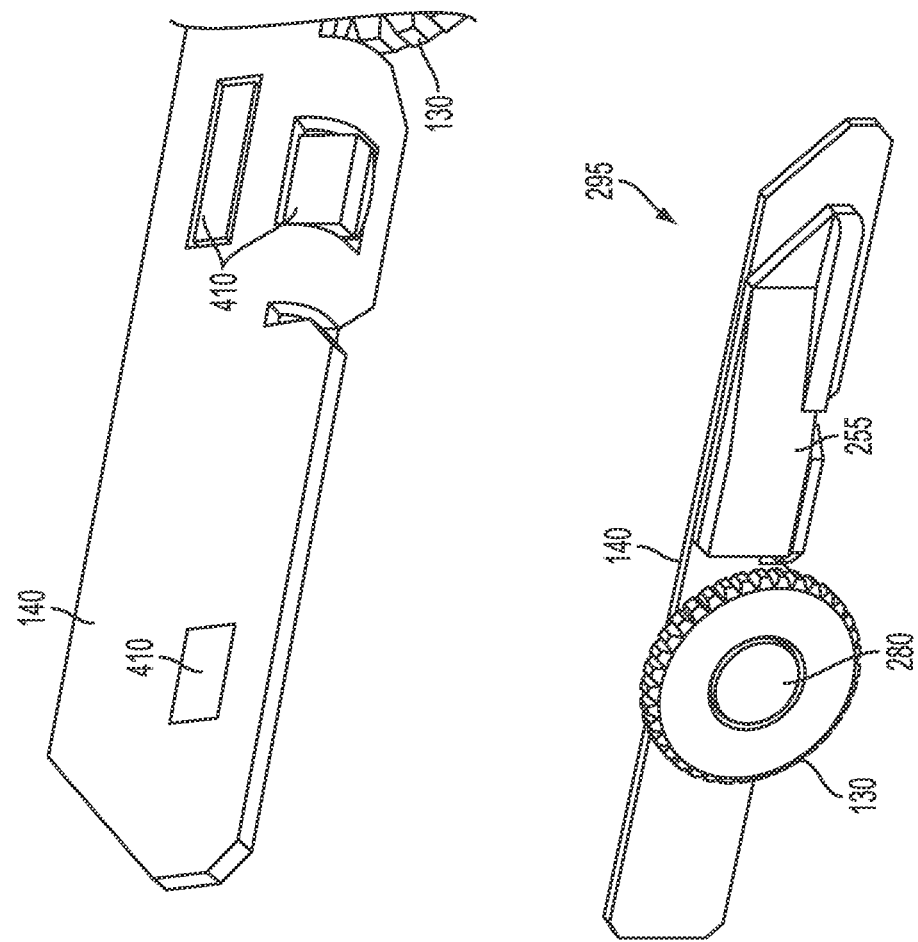
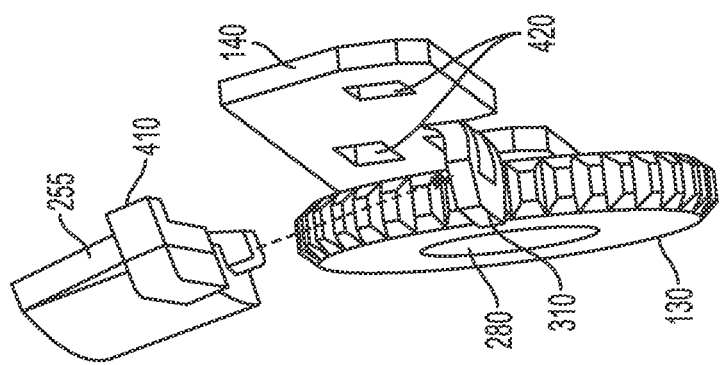
FIG. 4

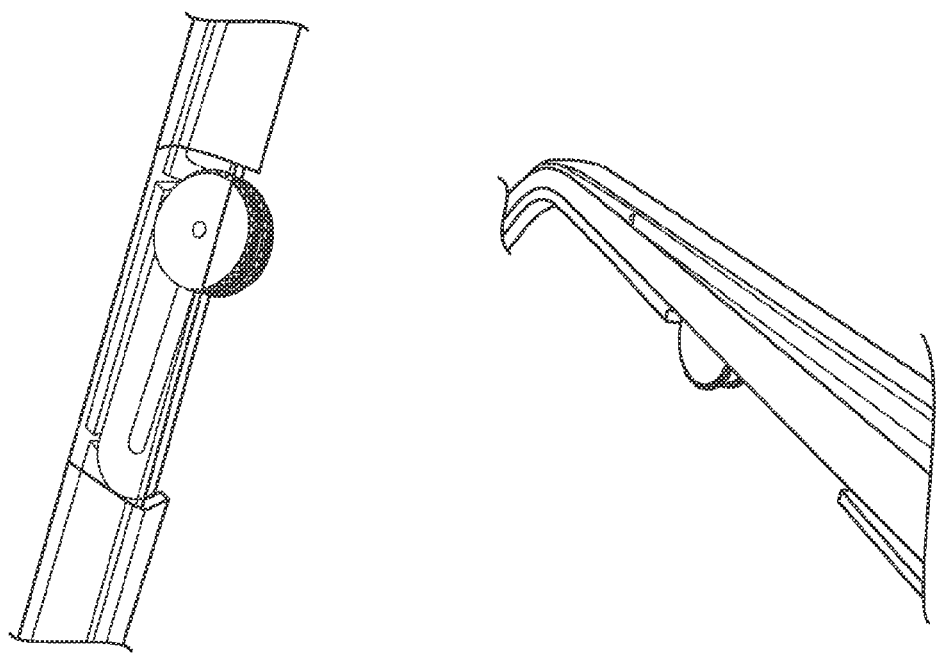
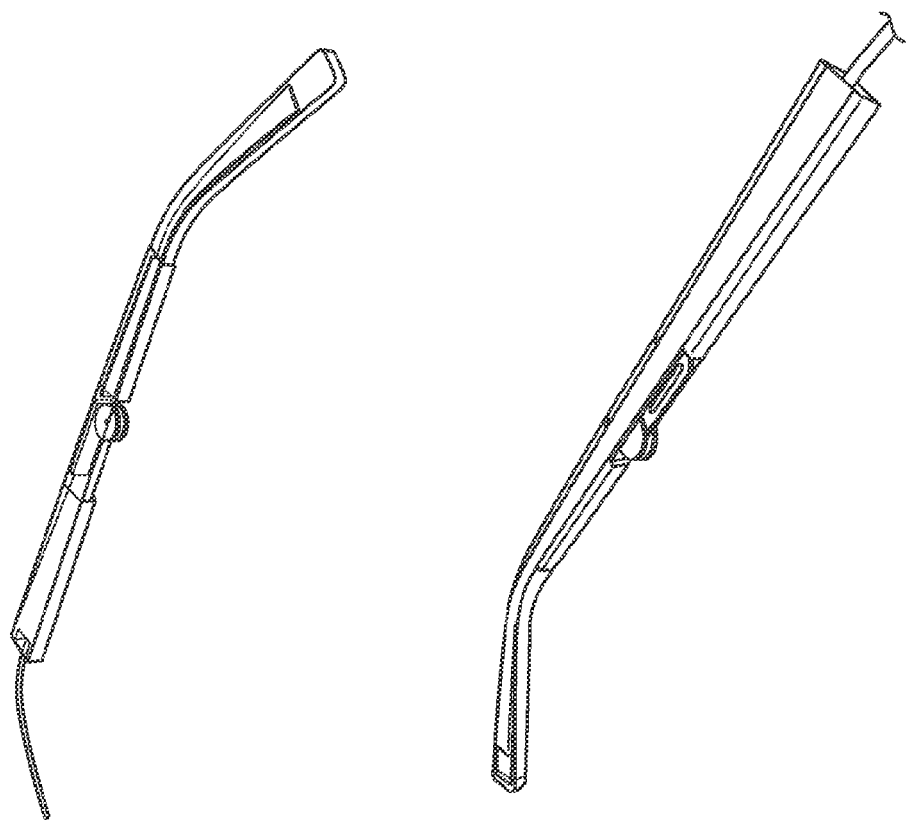
FIG. 13

SMALL CHANGE (2mm):
FROM 8mm TO 6mm

32mm LENS, 20 DEG FULCRUM/SPACER 2 HR TEST (STARTED AT 4:30 6/1)

| | 32mm ful/space | Diopter Readings | | |
|---|---|---|---|---|
| t(m) | TIME (SECONDS) | S | C | D+0.5C |
| 0.00 | 0 | 2.9 | 0.23 | 2.785 |
| 0.01 | 0.5 | 2.5 | 0.17 | 2.415 |
| 0.08 | 5 | 2.42 | 0.13 | 2.355 |
| 0.17 | 10 | 2.4 | 0.12 | 2.34 |
| 0.25 | 15 | 2.39 | 0.12 | 2.33 |
| 0.33 | 20 | 2.38 | 0.12 | 2.32 |
| 0.50 | 30 | 2.37 | 0.12 | 2.31 |
| 0.67 | 40 | 2.36 | 0.12 | 2.3 |
| 0.83 | 50 | 2.35 | 0.11 | 2.295 |
| 1.00 | 60 | 2.35 | 0.11 | 2.295 |
| 1.50 | 90 | 2.34 | 0.11 | 2.285 |
| 2.00 | 120 | 2.33 | 0.11 | 2.275 |
| 2.50 | 150 | 2.32 | 0.1 | 2.27 |
| 3.00 | 180 | 2.31 | 0.1 | 2.26 |
| 4.50 | 240 | 2.31 | 0.1 | 2.26 |
| 5.00 | 300 | 2.3 | 0.1 | 2.25 |
| 6.00 | 360 | 2.3 | 0.1 | 2.25 |
| 7.00 | 420 | 2.29 | 0.1 | 2.24 |
| 8.00 | 480 | 2.29 | 0.1 | 2.24 |
| 9.00 | 540 | 2.29 | 0.1 | 2.24 |
| 10.00 | 600 | 2.28 | 0.1 | 2.23 |
| 11.00 | 660 | 2.28 | 0.1 | 2.23 |
| 12.00 | 720 | 2.28 | 0.1 | 2.23 |
| 13.00 | 780 | 2.28 | 0.1 | 2.23 |
| 14.00 | 840 | 2.27 | 0.1 | 2.22 |
| 15.00 | 900 | 2.27 | 0.1 | 2.22 |
| 20.00 | 1200 | 2.26 | 0.09 | 2.215 |
| 30.00 | 1800 | 2.26 | 0.09 | 2.215 |

SMALL CHANGE (4mm):
FROM 4mm TO 0mm

LEFT AT 4mm, DROPPED TO 0 (2.75 HR TEST) (STARTED AT 11:45AM 6/1)

| | 32mm ful/space | Diopter Readings | | |
|---|---|---|---|---|
| t(m) | TIME (SECONDS) | S | C | D+0.5C |
| 0.00 | 0 | 2.5 | 0.17 | 2.415 |
| 0.01 | 0.5 | 2 | 0.18 | 1.91 |
| 0.08 | 5 | 1.69 | 0 | 1.69 |
| 0.17 | 10 | 1.64 | 0 | 1.64 |
| 0.25 | 15 | 1.62 | 0 | 1.62 |
| 0.33 | 20 | 1.6 | 0 | 1.6 |
| 0.50 | 30 | 1.57 | 0 | 1.57 |
| 0.67 | 40 | 1.55 | 0 | 1.55 |
| 0.83 | 50 | 1.54 | 0 | 1.54 |
| 1.00 | 60 | 1.53 | 0 | 1.53 |
| 1.50 | 90 | 1.51 | 0 | 1.51 |
| 2.00 | 120 | 1.5 | 0 | 1.5 |
| 2.50 | 150 | 1.5 | 0 | 1.5 |
| 3.00 | 180 | 1.49 | 0 | 1.49 |
| 4.00 | 240 | 1.48 | 0 | 1.48 |
| 5.00 | 300 | 1.47 | 0 | 1.47 |
| 6.00 | 360 | 1.46 | 0 | 1.46 |
| 7.00 | 420 | 1.46 | 0 | 1.46 |
| 8.00 | 480 | 1.46 | 0 | 1.46 |
| 9.00 | 540 | 1.45 | 0 | 1.45 |
| 10.00 | 600 | 1.45 | 0 | 1.45 |
| 15.00 | 900 | 1.44 | 0.07 | 1.405 |
| 20.00 | 1200 | 1.43 | 0.07 | 1.395 |
| 30.00 | 1800 | 1.43 | 0.08 | 1.39 |

FIG. 18

FLUID FILLED LENSES AND MECHANISMS OF INFLATION THEREOF

CROSS REFERENCE TO RELATED APPLICATIONS

This application is a National Stage of PCT application number PCT/US2010/052902, filed Oct. 10, 2015. PCT/US2010/052902 is a continuation of U.S. application Ser. No. 12/904,720, filed Oct. 14, 2010 (abandoned). This application claims the benefit of U.S. Provisional Patent Application No. 61/251,819, filed Oct. 15, 2009 (expired), which is incorporated herein by reference in its entirety.

BACKGROUND

1. Field

Embodiments of the present invention relate to fluid-filled lenses and in particular to variable fluid-filled lenses.

2. Background Art

Basic fluid lenses have been known since about 1958, as described in U.S. Pat. No. 2,836,101, incorporated herein by reference in its entirety. More recent examples may be found in "Dynamically Reconfigurable Fluid Core Fluid Cladding Lens in a Microfluidic Channel" by Tang et al., Lab Chip, 2008, vol. 8, p. 395, and in WIPO publication WO2008/063442, each of which is incorporated herein by reference in its entirety. These applications of fluid lenses are directed towards photonics, digital phone and camera technology and microelectronics.

Fluid lenses have also been proposed for ophthalmic applications (see, e.g., U.S. Pat. No. 7,085,065, which is incorporated herein by reference in its entirety). In all cases, the advantages of fluid lenses, such as a wide dynamic range, ability to provide adaptive correction, robustness, and low cost have to be balanced against limitations in aperture size, possibility of leakage, and consistency in performance. The '065 patent, for example, has disclosed several improvements and embodiments directed towards effective containment of the fluid in the fluid lens to be used in ophthalmic applications, although not limited to them (see, e.g., U.S. Pat. No. 6,618,208, which is incorporated by reference in its entirety). Power adjustment in fluid lenses has been effected by injecting additional fluid into a lens cavity, by electrowetting, application of ultrasonic impulse, and by utilizing swelling forces in a cross-linked polymer upon introduction of a swelling agent such as water.

BRIEF SUMMARY

In an embodiment, an actuator for a fluid-filled lens comprises: a housing; a reservoir disposed within the housing; a compression arm having a first end that is fixed and a second end that is not fixed, wherein the compression arm is disposed adjacent to the reservoir; and wherein the compression arm flexes to compress the reservoir.

In another embodiment, an actuator for a fluid-filled lens comprises: a housing having a first end and a second end; a reservoir disposed within the housing; and a slider slidingly disposed within the housing and disposed adjacent to the reservoir, wherein the slider includes a first end having a wedge shape configured to compress the reservoir, and wherein sliding of the slider from the second end of the housing to the first end of the housing causes the first end of the slider to compress the reservoir.

Further embodiments, features, and advantages of the present invention, as well as the structure and operation of the various embodiments of the present invention, are described in detail below with reference to the accompanying drawings.

BRIEF DESCRIPTION OF THE DRAWINGS/FIGURES

The accompanying drawings, which are incorporated herein and form a part of the specification, illustrate the present invention and, together with the description, further serve to explain the principles of the invention and to enable a person skilled in the pertinent art to make and use the invention.

FIG. 3 illustrates a first set of steps for assembling an embodiment of a slider subassembly.

FIG. 4 illustrates a second set of steps for assembling an embodiment of a slider subassembly.

FIG. 13 shows an embodiment of a caliper actuator assembly.

FIG. 18 shows charts with data corresponding to breadboard actuator performance for embodiments of a caliper actuator assembly.

FIG. 19b illustrates a top view of the roll and translate actuator assembly of FIG. 19a.

FIG. 20b illustrates a top view of the roll and translate actuator assembly of FIG. 20a.

FIG. 23b illustrates a top view of the rack and pinion actuator assembly of FIG. 23a.

FIG. 22c illustrates a side view of the rack and pinion actuator assembly of FIG. 23a when compressed.

Figure 1:
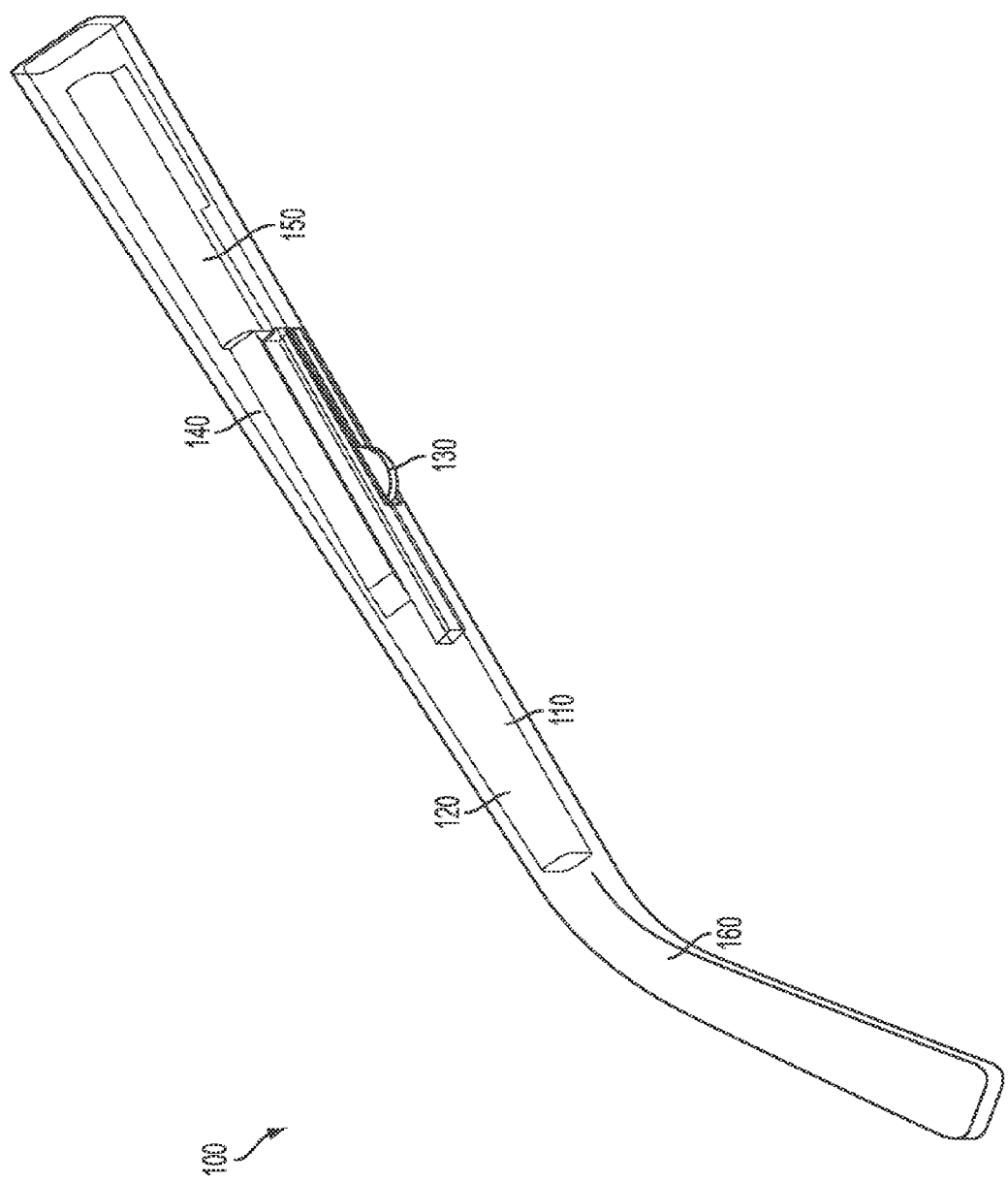
FIG. 1 illustrates a perspective view of an embodiment of a caliper actuator assembly.

Embodiments of the present invention will be described with reference to the accompanying drawings.

DETAILED DESCRIPTION

Although specific configurations and arrangements are discussed, it should be understood that this is done for illustrative purposes only. A person skilled in the pertinent art will recognize that other configurations and arrangements can be used without departing from the spirit and scope of the present invention. It will be apparent to a person skilled in the pertinent art that this invention can also be employed in a variety of other applications.

It is noted that references in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases do not necessarily refer to the same embodiment. Further, when a particular feature, structure or characteristic is described in connection with an embodiment, it would be within the knowledge of one skilled in the art to effect such feature, structure or characteristic in connection with other embodiments whether or not explicitly described.

Fluid lenses have important advantages over conventional means of vision correction, such as rigid lenses and contact lenses. First, fluid lenses are easily adjustable. Thus, a presbyope who requires an additional positive power correction to view near objects can be fitted with a fluid lens of base power matching the distance prescription. The user can then adjust the fluid lens to obtain additional positive power correction as needed to view objects at intermediate and other distances.

Second, fluid lenses can be adjusted continuously over a desired power range by the wearer. As a result, the wearer can adjust the power to precisely match the refractive error for a particular object distance in a particular light environment. Thus, fluid lenses allow adjustment of power to compensate for alteration of the natural depth of focus of the eye that depends on the wearer's pupil size, which is in turn dependent on the ambient light level.

Third, although 20/20 vision, which corresponds to an image resolution of 1 minute of arc (1/60 degree) is generally acknowledged to represent an acceptable quality of vision, the human retina is capable of finer image resolution. It is known that a healthy human retina is capable of resolving 20 seconds of arc (1/300 degree). Corrective eyeglasses designed to enable a patient to achieve this superior level of vision have a resolution of about 0.10 D or better. This resolution can be achieved with continuously adjustable fluid lens elements.

In an embodiment of a fluid lens assembly, one or more fluid lenses may be provided with its own actuation system, so that a lens for each eye can be adjusted independently. This feature allows wearers, such as anisometropic patients, to correct any refractive error in each eye separately, so as to achieve appropriate correction in both eyes, which can result in better binocular vision and binocular summation.

FIG. 1 illustrates a perspective view of a caliper actuator assembly 100, according to an embodiment of the present invention. Caliper actuator assembly 100 includes temple cover 110, which includes a hollow outer portion and a hollow inner portion formed together to enclose additional pieces of caliper actuator assembly 100. Distal end 160 of temple cover 110 is shaped to fit over a wearer's ear. Caliper actuator assembly 100 further includes temple chassis 120, wheel 130, and slider 140. In an embodiment, wheel 130 and slider 140 are longitudinally slidably disposed within temple chassis 120. Caliper actuator assembly 100 operates to compress reservoir 150 and transfer fluid between reservoir 150 and a fluid lens (not shown). The compressing force may be applied in various ways, such as for example, by rotating wheel 130 or by translating the wheel along a slot. Additional methods of applying compressing force are also described herein. The compression of reservoir 150 may be effected either by compressing reservoir 150 in a vertical or horizontal direction against a ceiling or inner wall of temple chassis 120, as described in detail below.

Figure 2:
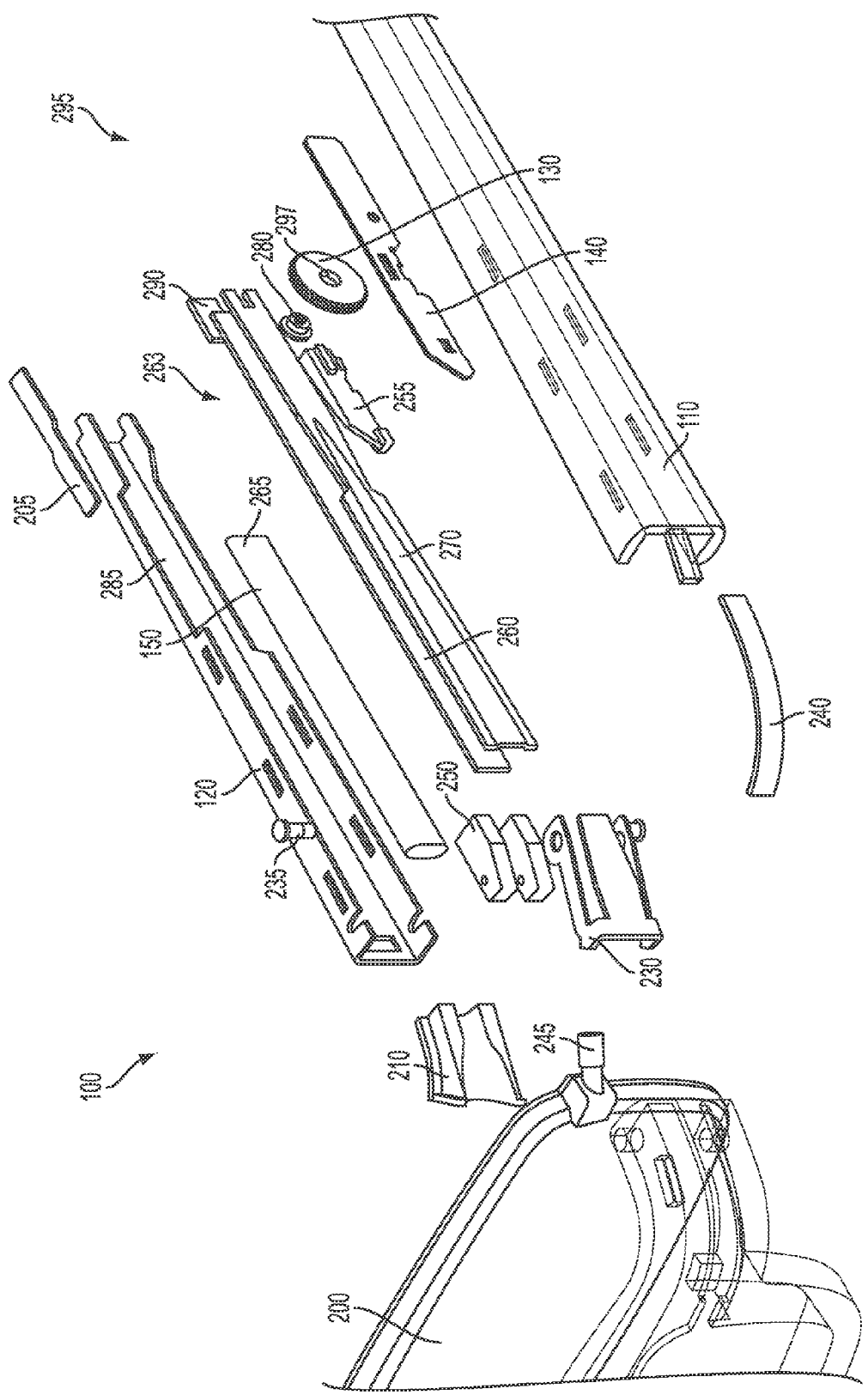
FIG. 2 illustrates an exploded perspective view of an embodiment of a caliper actuator assembly.

FIG. 2 illustrates an exploded perspective view of an embodiment of caliper actuator assembly 100. In an embodiment, slider subassembly 295 (described below with respect to FIGS. 3-4) is configured to translate along one or more of temple cover 110 and temple chassis 120 in order to compress reservoir 150. In operation, a user rotates wheel 130, which moves slider block 255, which in turn compresses a relatively stiff metal plate, such as compression arm 270, that is in contact with a first side surface 265 of reservoir 150. A second side surface (not shown) of reservoir 150 is placed against inner wall 285 of temple chassis 120, a portion of temple cover 110, or any other suitable surface. Slider 140 presses against compression aim 270, which compresses reservoir 150 in a controllable manner. In an embodiment, the length of the lateral movement of wheel 130 is proportional to the magnitude of compression of the compression arm, and is proportional to the magnitude of compression of the reservoir.

In an embodiment, wheel 130 has a knurled edge in order to provide secure contact with the finger of the user as well more precise control over the translation of wheel 130.

Lens module 200 is connected via outlet port 245 to a connecting tube (not shown), which is connected to reservoir 150. Lens module 200 may further include a flexible back surface provided by, for example, a flexible membrane (not shown) stretched flat over the edge of a rigid optical lens. To change the optical power of fluid filled lens module 200, the membrane may be inflated through the addition of a fluid from reservoir 150.

The connecting tube delivers fluid from lens module 200 to reservoir 150 and vice versa. The connecting tube is designed to be relatively impermeable to the fluid contained therein. In an embodiment, the connecting tube is configured to allow a minimum flow rate at all times in order to ensure a minimum speed of response to the user moving wheel 130 in order to change the optical power of fluid filled lens module 200. The connecting tube is connected at one end to outlet port 245 of lens module 200 and at the other end to reservoir 150. In an embodiment, the overall assembly including the lens module 200, the connecting tube, and reservoir 150 is designed to maintain a seal excluding fluids and air for an overall use period of two years or more. In an embodiment, the connecting tube is thin in order to be accommodated within a hinge cavity. In an embodiment, it is less than 2.0 mm in outer diameter and less than 0.50 mm in wall thickness, in order to maintain an adequate flow of fluid. In an embodiment, it is capable of being bent by an angle of no less than 60 degrees. In an embodiment, it is capable of being bent by an angle of no less than 45 degrees without crimping. In an embodiment, it is durable to repeated flexing of the hinge.

Hinge block 250 and spring 230 are enclosed within a covered area between inner block 210 and outer block 240. Additional embodiments of the hinge and spring are described in U.S. application Ser. No. 12/904,769. Caliper actuator assembly 100 includes wheel 130 held in place by axle 280, slider 140, slider block 255, spacer block 290, and compression arm 270. These parts are assembled into a temple chassis subassembly (which is described further with respect to FIGS. 7 and 8) and are held in place by screws 235. Rubber strip 205 includes a flexible surface upon which wheel 130 may move. In an embodiment, wheel 130 may rotate. In another embodiment it may translate, and in yet another embodiment it may rotate and translate.

In an embodiment, slider 140 maintains reservoir 150 in its compressed state as it moves away from distal end 160. As slider 140 is moved towards distal end 160, the compressing force on reservoir 150 is released, and reservoir 150 springs back to its original shape, temporarily creating low pressure on the fluid, and thus pulling fluid back from lens module 200.

Materials

The pieces of the various actuator assemblies described herein, for example, but not limited to, the temple cover, temple chassis, wheel, slider, spring, screws, inner block, outer block, axle, compression arm, spacer block, etc, may be manufactured through any suitable process, such as metal injection molding (MIM), cast, machining, plastic injection molding, and the like. The choice of materials may be further informed by the requirements of mechanical properties, temperature sensitivity, optical properties such as dispersion, moldability properties, or any other factor apparent to a person having ordinary skill in the art.

The fluid used in the fluid lens may be a colorless fluid, however, other embodiments include fluid that is tinted, depending on the application, such as if the intended application is for sunglasses. One example of fluid that may be used is manufactured by Dow Corning of Midland, Mich., under the name "diffusion pump oil," which is also generally referred to as "silicone oil."

The fluid lens may include a rigid optical lens made of glass, plastic, or any other suitable material. Other suitable materials include, for example and without limitation, Diethylglycol bisallyl carbonate (DEG-BAC), poly(methyl methacrylate) (PMMA), and a proprietary polyurea complex, trade name TRIVEX (PPG).

The fluid lens may include a membrane made of a flexible, transparent, water impermeable material, such as, for example and without limitation, clear and elastic polyolefins, polycycloaliphatics, polyethers, polyesters, polyimides and polyurethanes, for example, polyvinylidene chloride films, including commercially available films, such as those manufactured as MYLAR or SARAN. Other polymers suitable for use as membrane materials include, for example and without limitation, polysulfones, polyurethanes, polythiourethanes, polyethylene terephthalate, polymers of cycloolefins and aliphatic or alicyclic polyethers.

The connecting tube may be made of one or more materials such as TYGON (polyvinyl chloride), PVDF (Polyvinyledene fluoride), and natural rubber. For example, PVDF may be suitable based on its durability, permeability, and resistance to crimping.

The temple cover may be any suitable shape, and may be made of plastic, metal, or any other suitable material. In an embodiment, the temple cover is made of a lightweight material such as, for example and without limitation, high impact resistant plastics material, aluminum, titanium, or the like. In an embodiment, the temple cover may be made entirely or partly of a transparent material.

The reservoir may be made of, for example and without limitation, Polyvinyledene Difluoride, such as Heat-shrink VITON®, supplied by DuPont Performance Elastomers LLC of Wilmington, Del., DERRY-KYF 190 manufactured by DSG-CANUSA of Meckenheim, Germany (flexible), RW-175 manufactured by Tyco Electronics Corp. of Berwyn, Pa. (formerly Raychem Corp.) (semirigid), or any other suitable material. Additional embodiments of the reservoir are described in U.S. application Ser. No. 12/904,736.

Assembly

FIGS. 3-4 illustrate a set of steps for assembling an embodiment of slider subassembly 295. Beginning with FIG. 3, axle 280 is first placed within hole 297 located in the center of wheel 130. Next, slider 140 is placed onto axle 280 with slider tab 310 on the same side of slider 140 as wheel 130. Next, slider 140 is laser welded to axle 280. The slider subassembly continues with FIG. 4, which illustrates a second set of steps for assembling an embodiment of the slider subassembly. Slider block 255 is assembled to slider 140 by snapping and pressing various tabs 410 protruding from slider block 255 into corresponding slots 420 located in slider 140.

Figure 5:
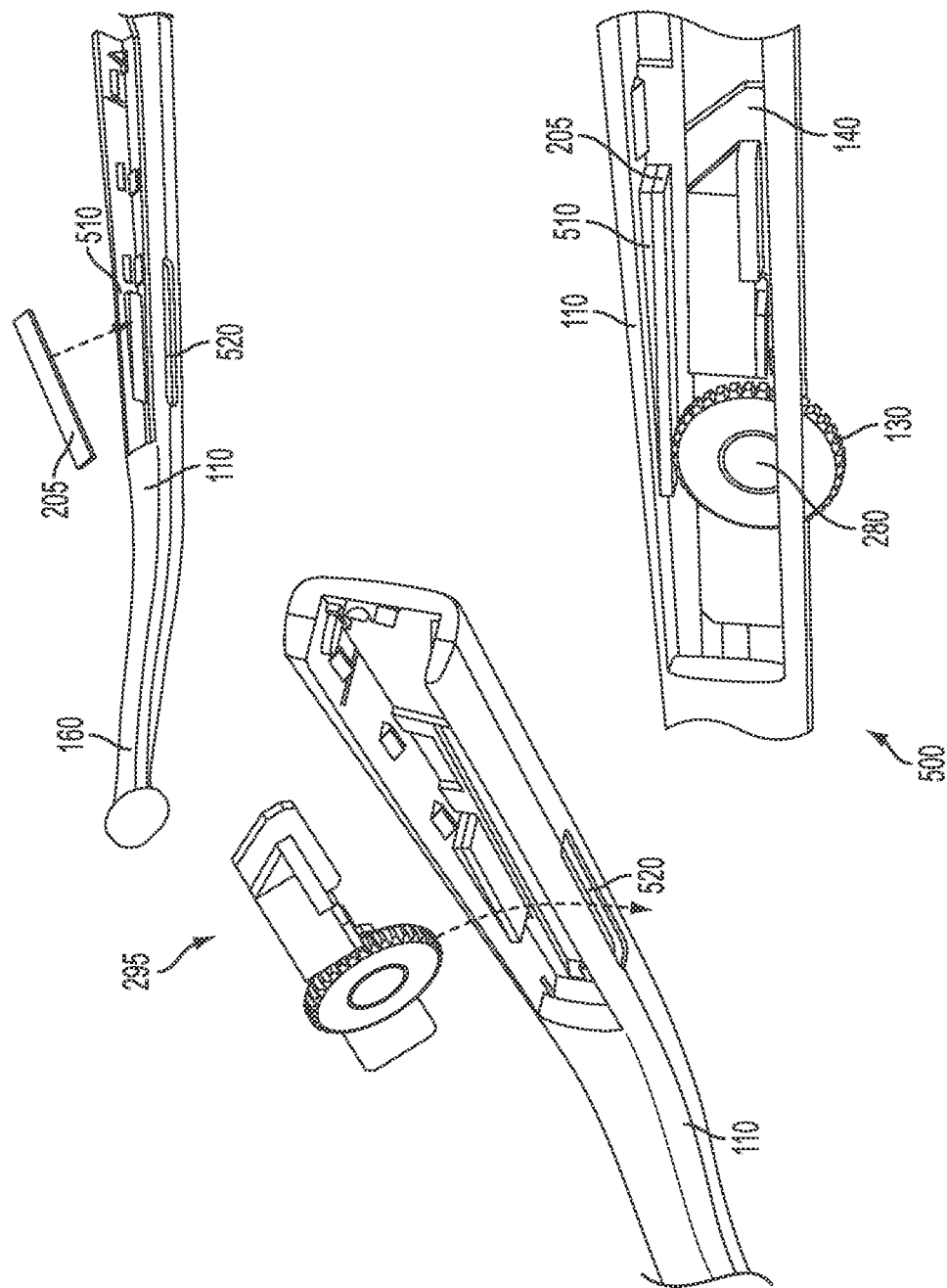
FIG. 5 illustrates a set of steps for assembling an embodiment of a temple cover subassembly.

FIG. 5 illustrates a set of steps for assembling an embodiment of a temple cover subassembly 500. First, an adhesive (not shown) is applied to rubber strip 205. Although strip 205 is referred to herein as a rubber strip, one of skill in the art will recognize that strip 205 may be made from any elastic or semi-elastic material. Next, rubber strip 205 is applied to ramped surface 510 of temple cover 110. Next, wheel 130 of slider subassembly 295 is inserted into corresponding slot 520 of temple cover 110. Friction between rubber strip 205 and wheel 130 allows wheel 130 to rotate around axle 280 while translating within temple cover 110.

Figure 6:
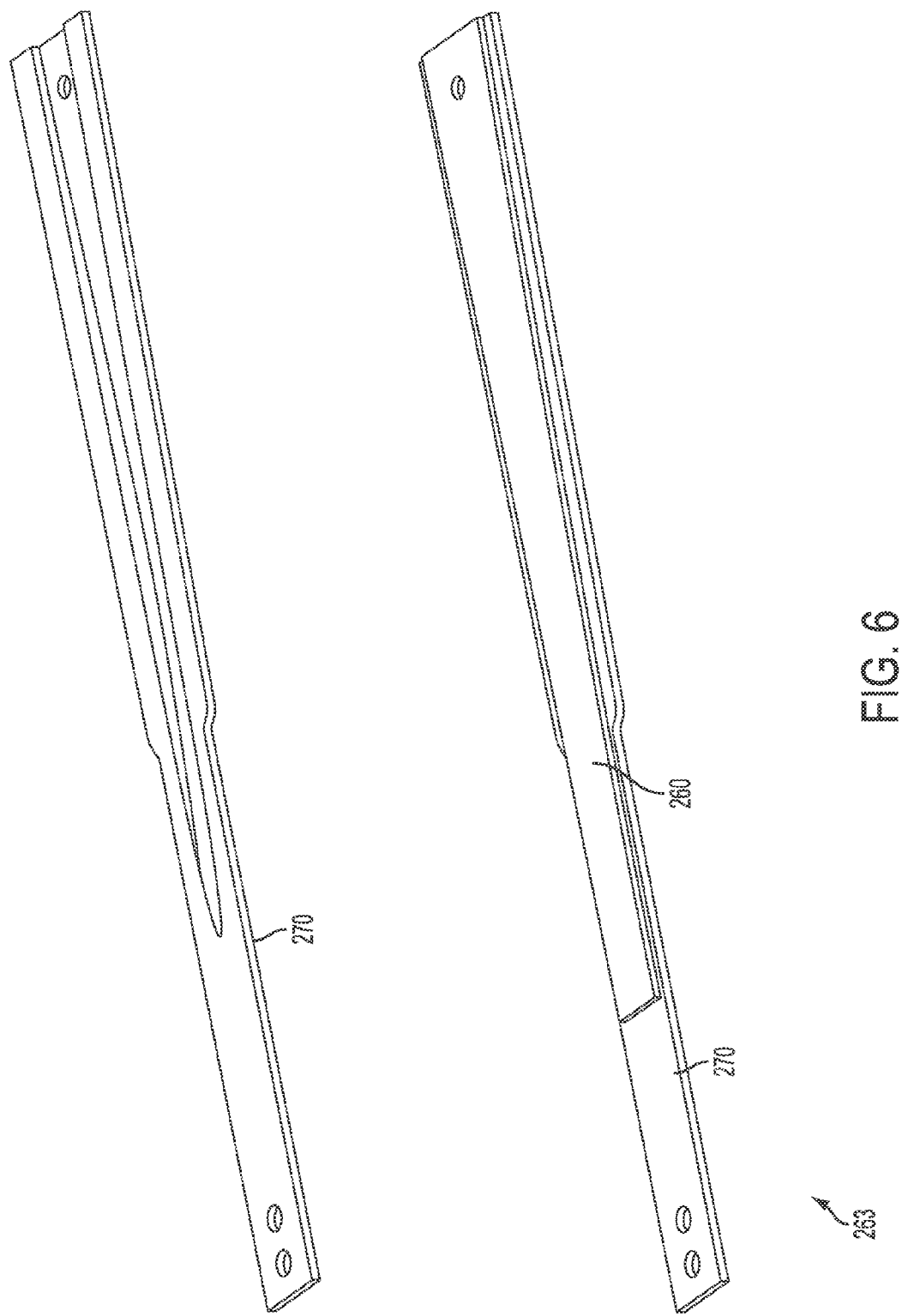
FIG. 6 illustrates a set of steps for assembling an embodiment of a compression arm subassembly.

FIG. 6 illustrates a set of steps for assembling compression arm subassembly 263, according to an embodiment of the present invention. First, backing 260 is placed onto compression arm 270. Next backing 260 is laser welded to compression arm 270.

Figure 7:
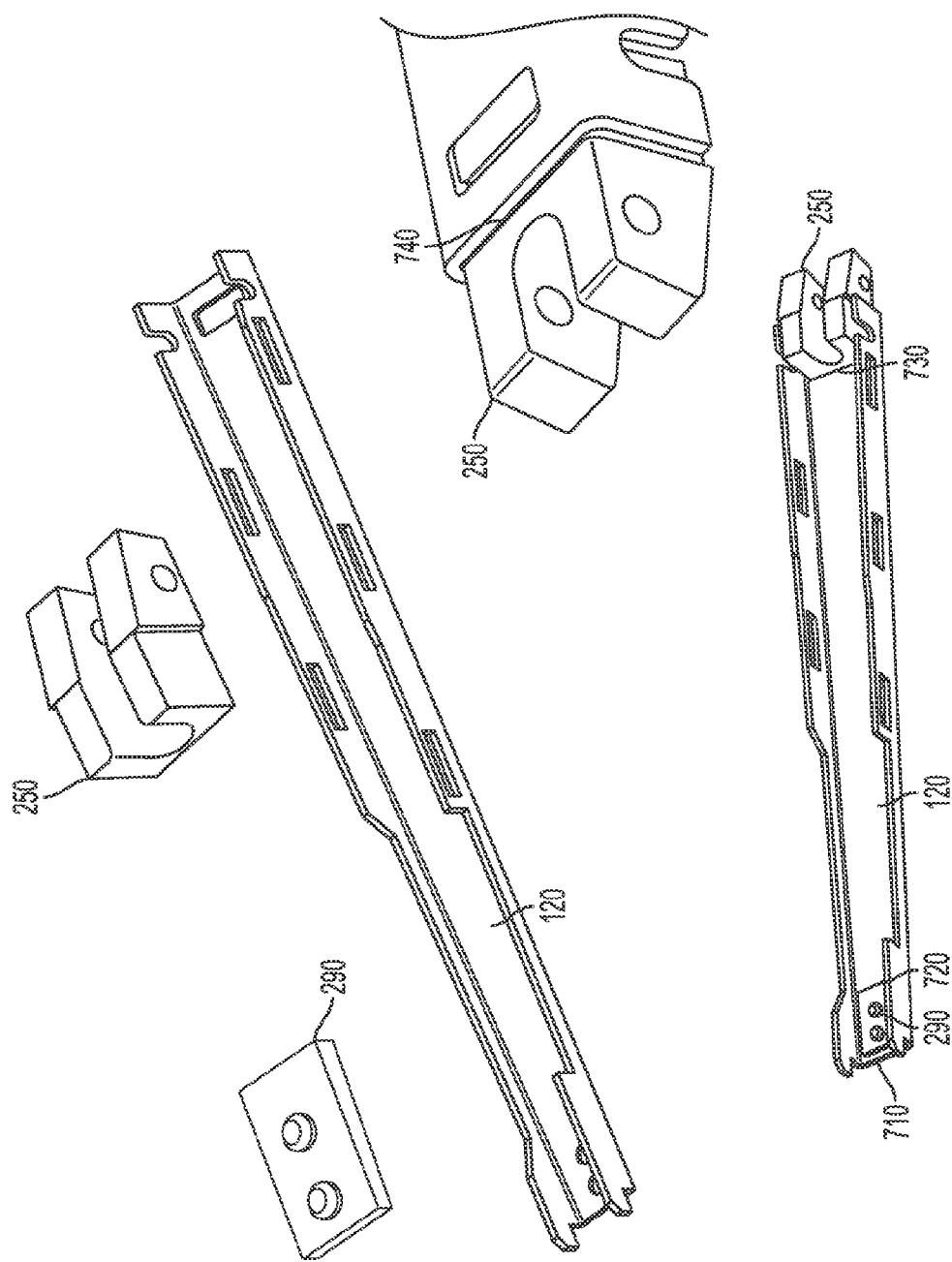
FIG. 7 illustrates a first set of steps for assembling an embodiment of a temple chassis subassembly.
Figure 8:
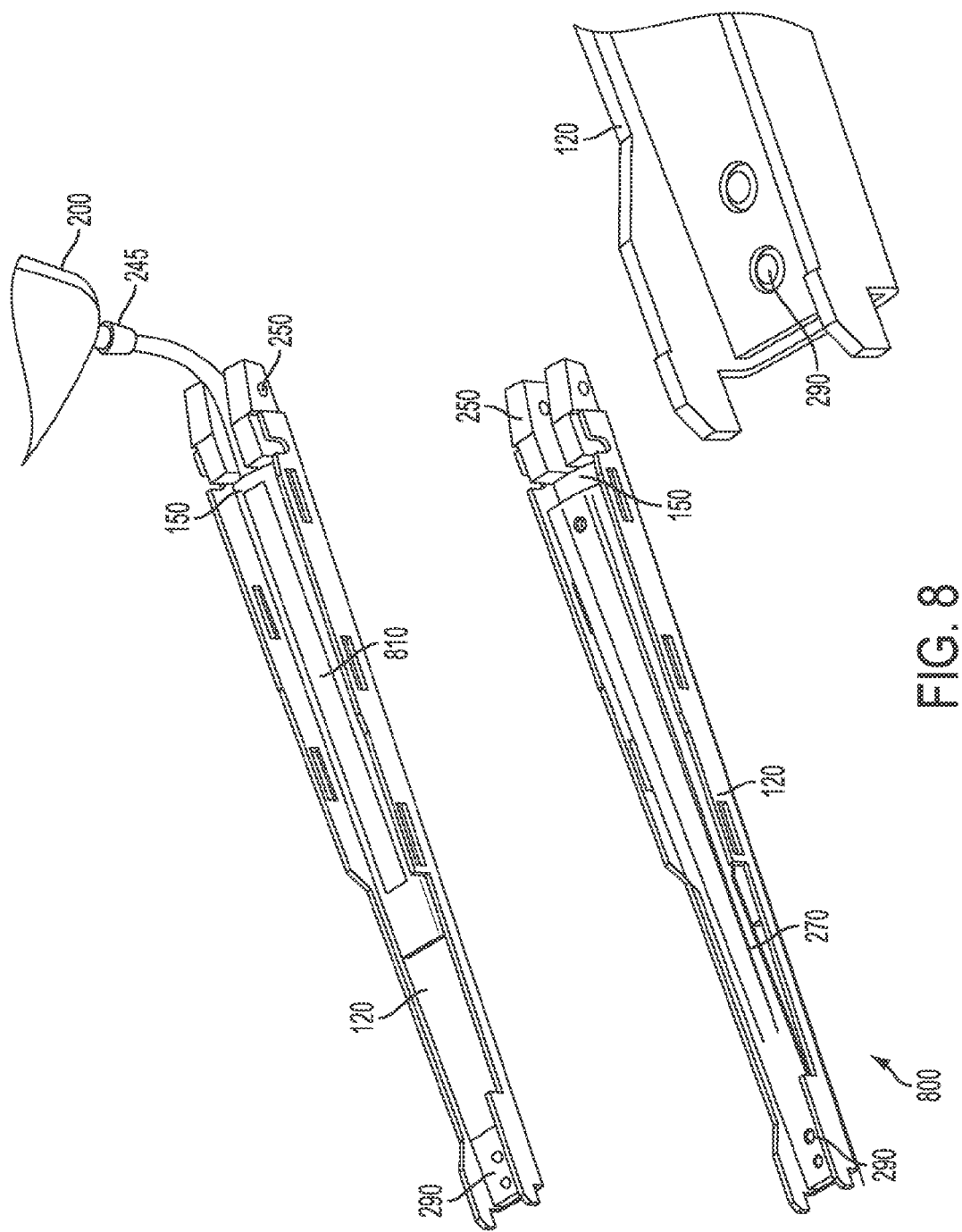
FIG. 8 illustrates a second set of steps for assembling an embodiment of a temple chassis subassembly.

FIGS. 7-8 illustrate a set of steps for assembling an embodiment of a temple chassis subassembly. Beginning with FIG. 7, spacer block 290 is placed onto temple chassis 120. Next, spacer block 290 is welded onto temple chassis 120 along edges 710 and 720. Next, hinge block 250 is placed onto temple chassis 120. Next, hinge block 250 is welded onto temple chassis 120 along edges 730 and 740. The temple chassis subassembly continues with FIG. 8, which illustrates a second set of steps for assembling an embodiment of temple chassis subassembly 800. A backing (not shown) may be removed from tape 810 on both sides of reservoir 150. Reservoir 150 is placed against temple chassis 120. Compression arm 270 is then placed onto spacer block 290. Compression aim 270 is then welded onto spacer block 290.

Figure 9:
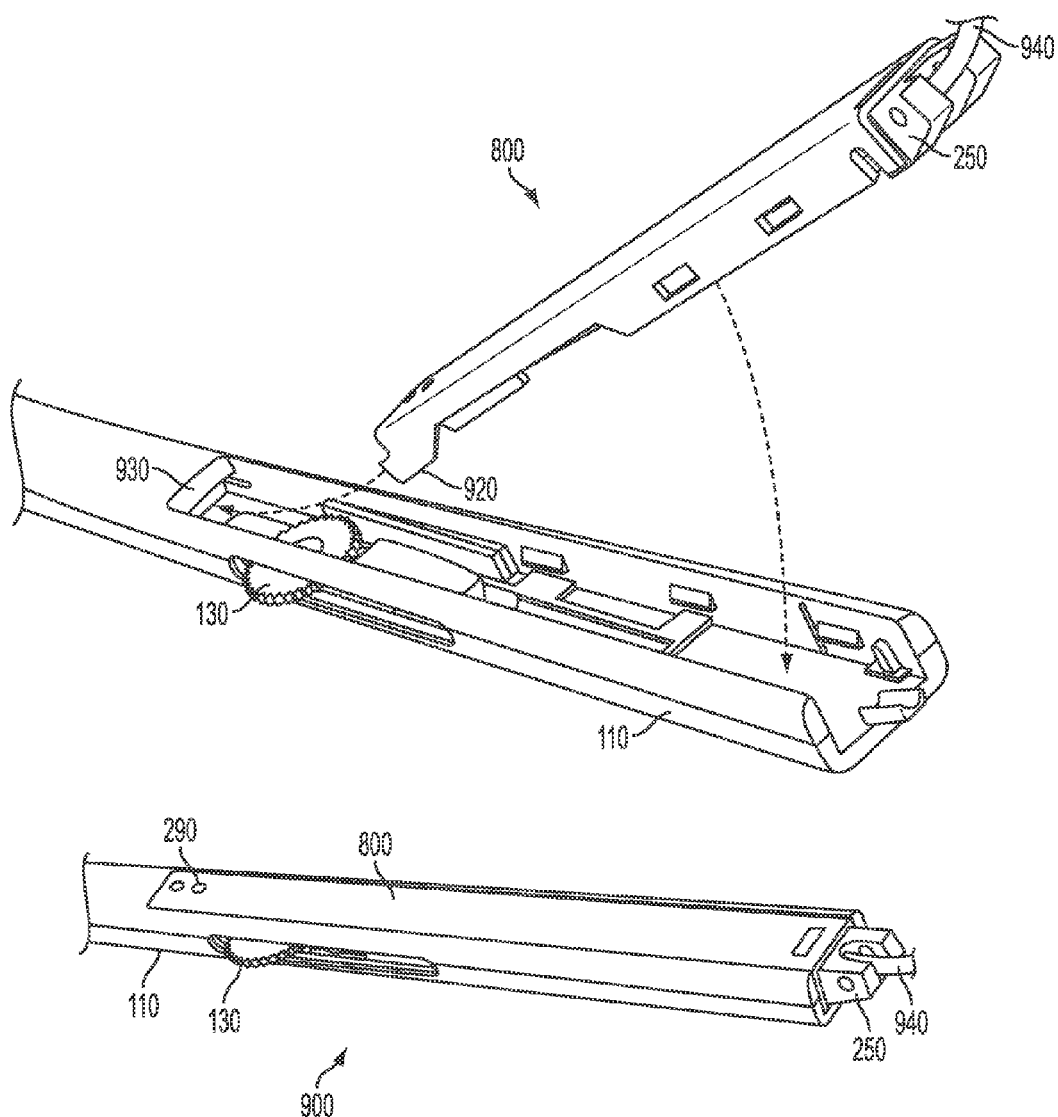
FIG. 9 illustrates a set of steps for assembling an embodiment of a temple subassembly.

FIG. 9 illustrates a set of steps for assembling temple subassembly 900, according to an embodiment. First, tabs 920 of temple chassis subassembly 800 are slid into rear slot 930 of temple cover 110. Next, temple chassis subassembly 800 is rotated within temple cover 110 until it snaps into place. It is recommended that slider subassembly 295 be positioned as far distally as possible within temple cover 110. Further, it is recommended that when snapping temple chassis subassembly 800 into temple cover 110, tube 940 does not become pinched between hinge block 250 and temple cover 110 or temple chassis subassembly 800.

Figure 10:
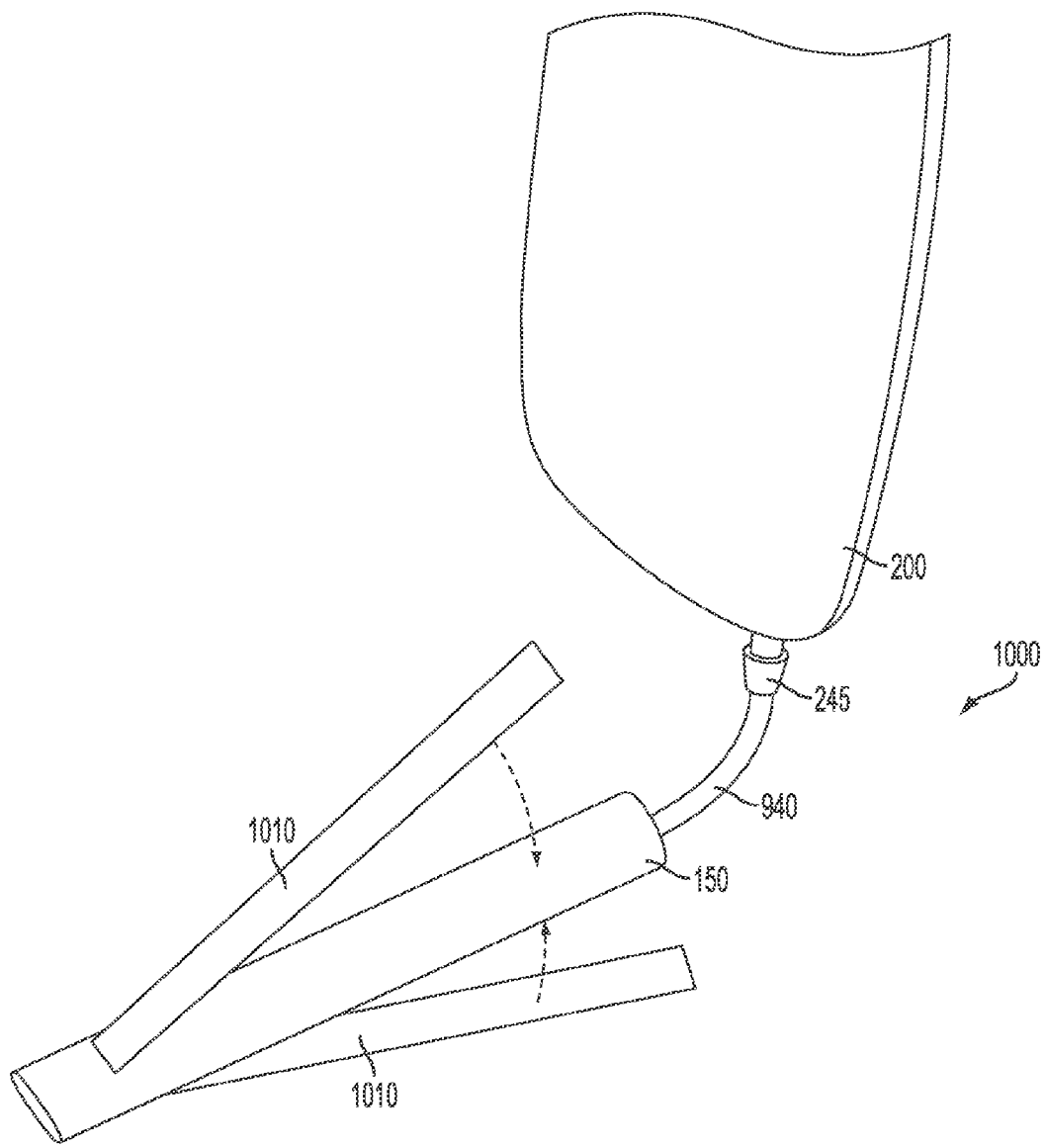
FIG. 10 illustrates a set of steps for assembling an embodiment of a lens module subassembly.

FIG. 10 illustrates a set of steps for assembling lens module subassembly 1000, according to an embodiment. First, a suitable piece of 2-sided tape 1010 is applied on an outward facing side of reservoir 150. This process is repeated for the opposite side of reservoir 150. The backing of tape 1010 is then removed when lens module subassembly 1000 is in position within caliper actuator assembly 100.

Figure 11:
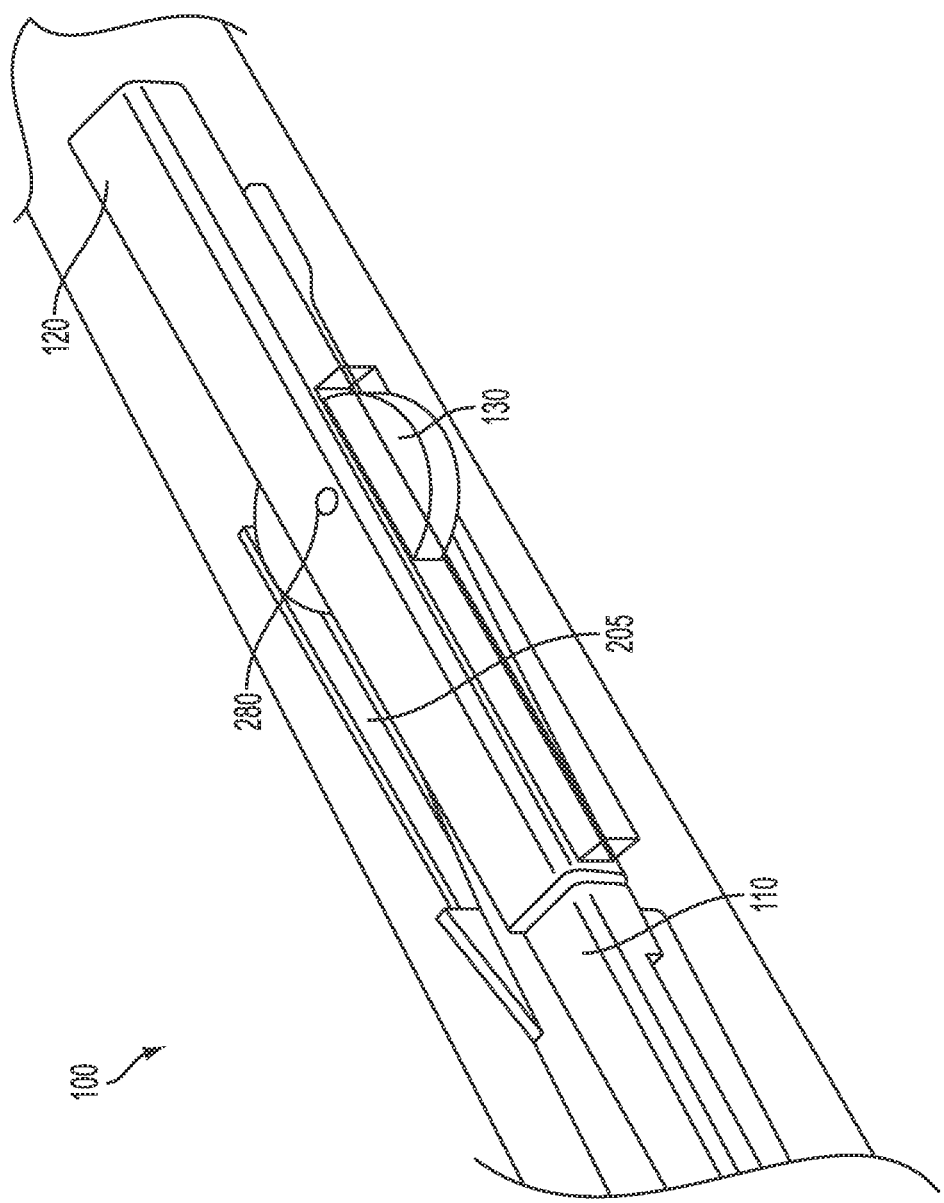
FIG. 11 illustrates a perspective view of a portion of an embodiment of a caliper actuator assembly.
Figure 12:
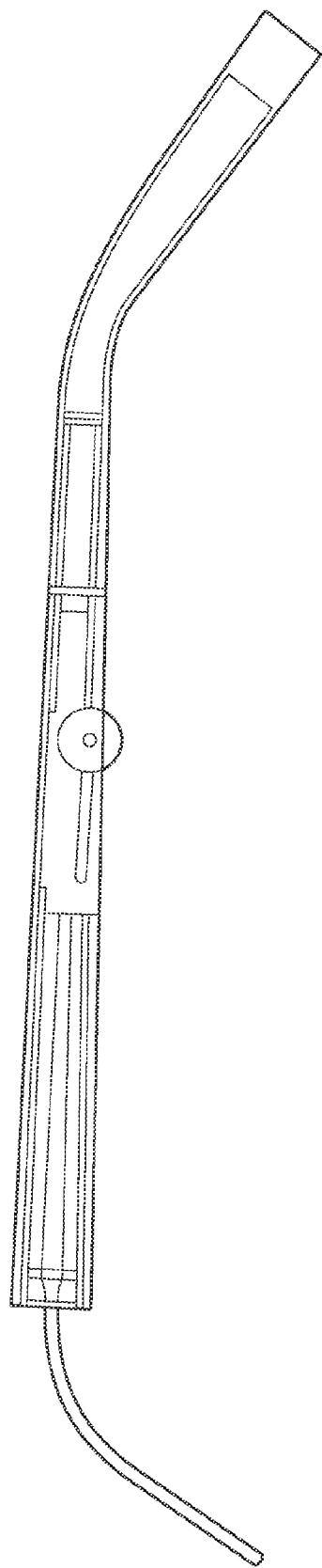
FIG. 12 shows an embodiment of a caliper actuator assembly.
Figure 14:
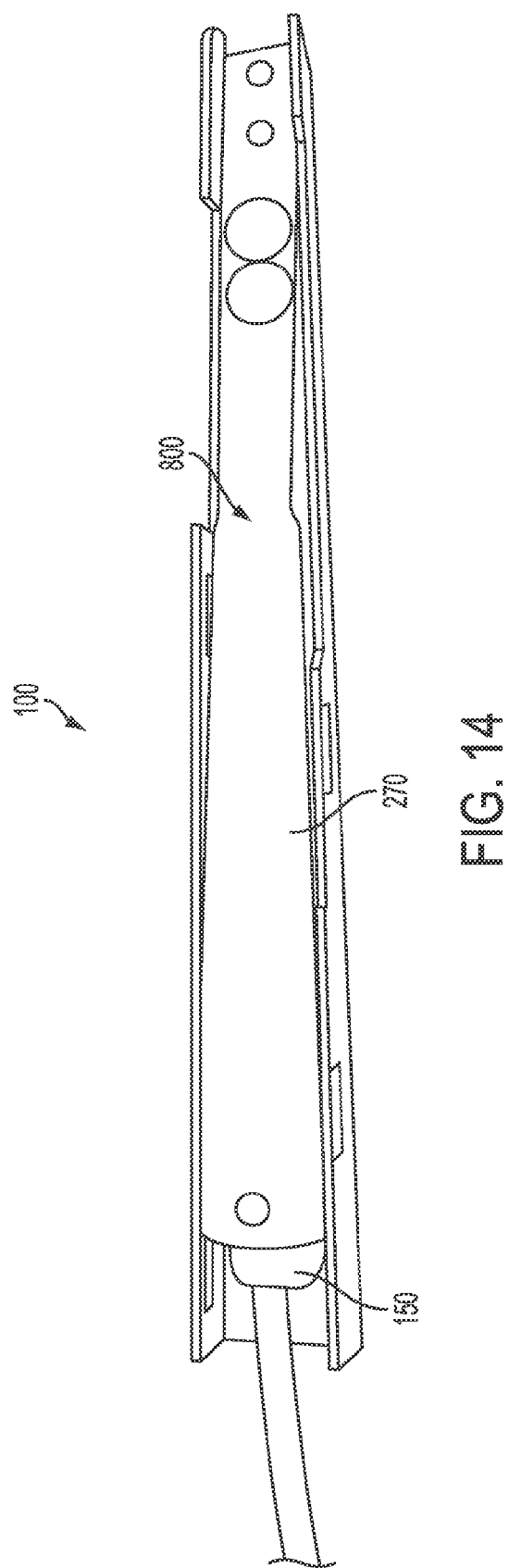
FIG. 14 shows an embodiment of a caliper actuator assembly with a portion of the temple cover removed.

FIG. 11 is a perspective view of a portion of an embodiment of caliper actuator assembly 100. FIG. 12 shows an embodiment of caliper actuator assembly 100. FIG. 13 shows additional views of an embodiment of caliper actuator assembly 100. FIG. 14 shows an embodiment of caliper actuator assembly 100 with a portion of temple cover 110 removed to show temple chassis subassembly 800.

Figure 15:
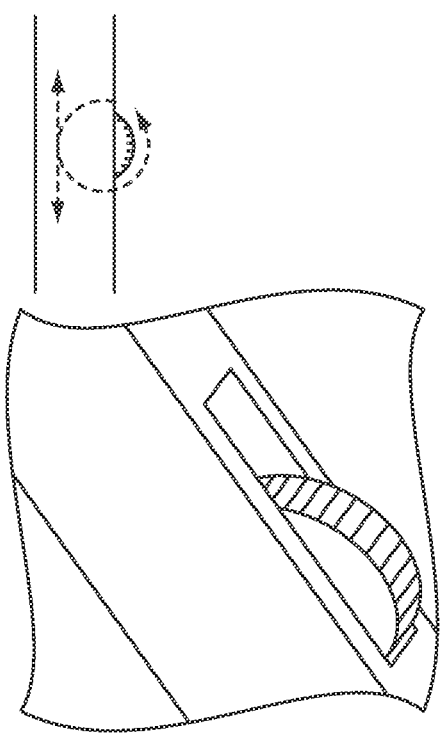
FIG. 15 illustrates a portion of an embodiment of a caliper actuator assembly.

FIG. 15 illustrates a portion of an embodiment of a caliper actuator assembly, showing the rotation of the wheel with respect to the temple cover.

Figure 16:
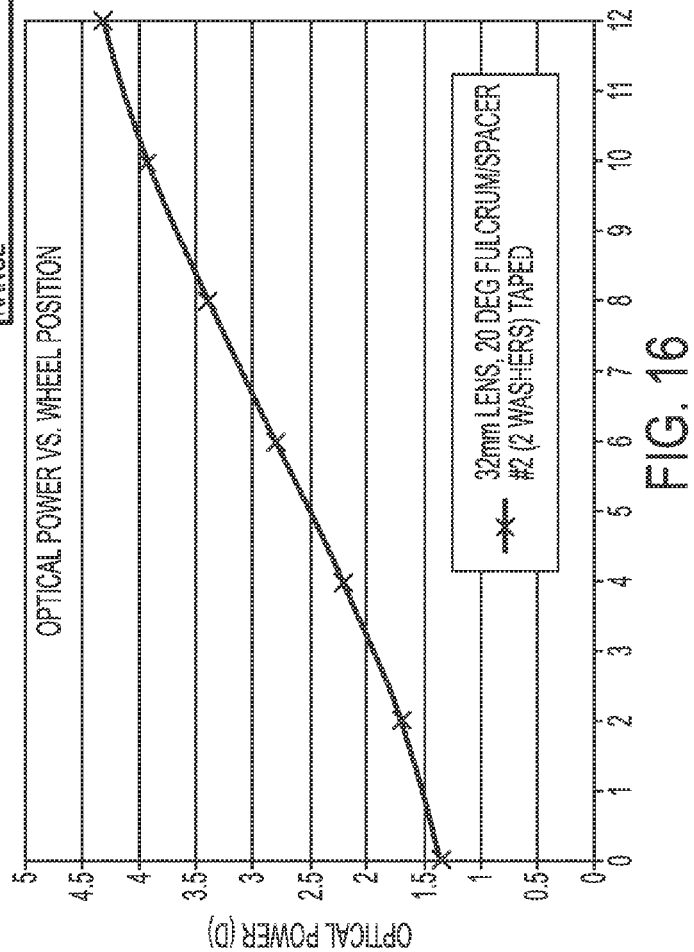
FIG. 16 shows charts with data corresponding to breadboard actuator performance for an embodiment of a caliper actuator assembly.

FIG. 16 shows charts with data corresponding to breadboard actuator performance for an embodiment. The charts show the changes in optical power of a fluid lens module connected to a reservoir in contact with an actuator, according to an embodiment. The charts show optical power at the optical center of the exemplary lens as a function of the position of the wheel within the slot with respect to diopter readings S, C, and D+0.5C. The linearity in response demonstrates that a wearer of an embodiment of the fluid-filled lenses will be able to achieve the desired level of correction by adjusting the location of the wheel within the slot.

Figure 17A:
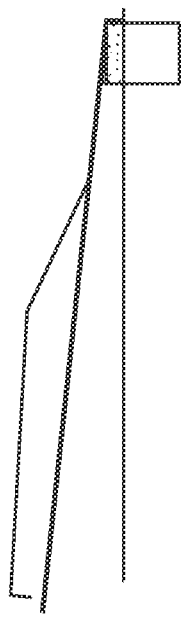
FIG. 17a illustrates an embodiment of a caliper actuator assembly.
Figure 17B:
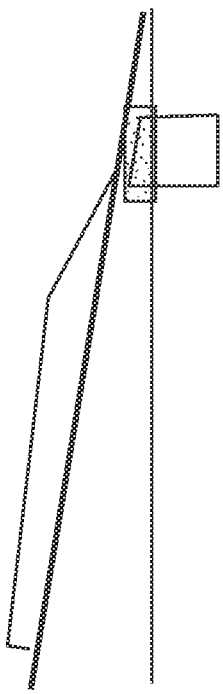
FIG. 17b illustrates an embodiment of a caliper actuator assembly.

FIGS. 17a and 17b illustrate two embodiments of caliper actuator assemblies wherein the position of slider block 255 is changed in order to shorten the length of the lever arm. FIG. 18 shows charts with data corresponding to breadboard actuator performance between the embodiments of FIGS. 17a and 17b. The charts show the reversibility of optical power in an exemplary fluid lens module with respect to diopter readings S, C, and D+0.5C. The data shows that while the changes in optical power are reversible, the rate of change is variable, and depends on the initial location of the wheel within the slot. This data indicates that reversibility of the fluid lens module is improved with increased stiffness of the compression arm. However, as would be apparent to one having ordinary skill in the art, less stiff compression arms may also have beneficial properties.

Additional embodiments of actuators will now be described. Similarly to the caliper actuator embodiments described above, each of the following actuator embodiments serve to compress a reservoir located in one or more temples of a fluid-filled lens assembly in order to adjust the optical power of a fluid-filled lens.

Figure 19A:
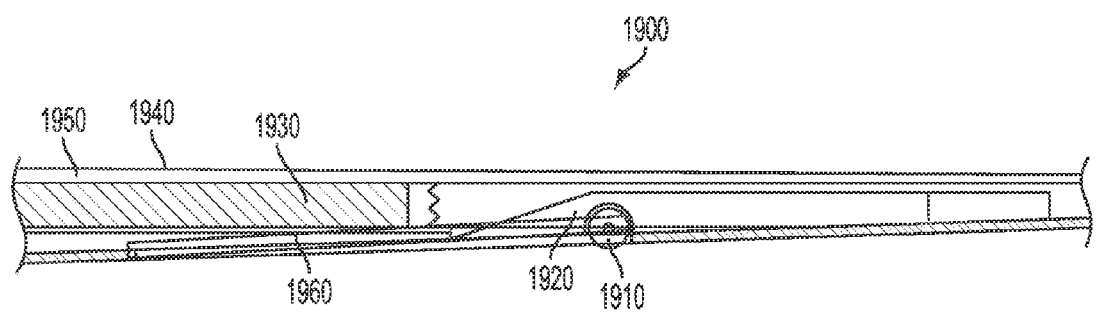
FIG. 19a illustrates a side view of an embodiment of a roll and translate actuator assembly.
Figure 19B:
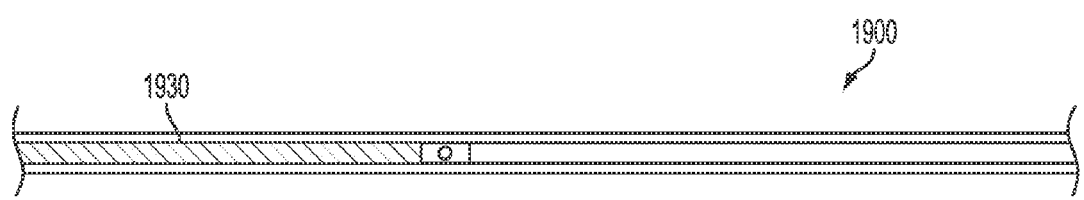
Figure 19C:
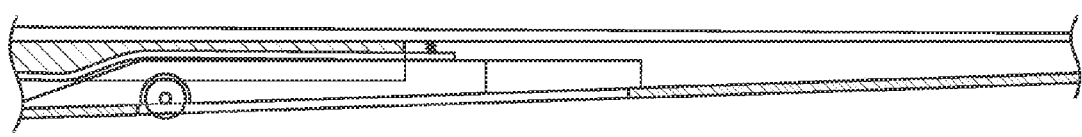
FIG. 19c illustrates a side view of the roll and translate actuator assembly of FIG. 19a when compressed.

FIG. 19a illustrates a side view of an embodiment of roll and translate actuator 1900 with vertical compression of reservoir 1930. Roll and translate actuator 1900 includes wheel 1910, slider 1920, reservoir 1930, and temple chassis 1940. In roll and translate actuator 1900, wheel 1910 translates along track 1960. Slider 1920 slides with wheel 1910 and compresses reservoir 1930 against temple chassis ceiling 1950 of temple chassis 1940. FIG. 19b illustrates a top view of the roll and translate actuator of FIG. 19a. FIG. 19c illustrates a side view of the roll and translate actuator of FIG. 19a when compressed.

Figure 20A:
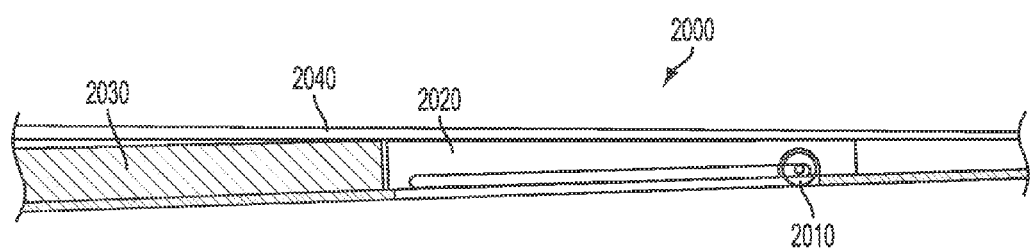
FIG. 20a illustrates a side view of another embodiment of a roll and translate actuator assembly.
Figure 20B:
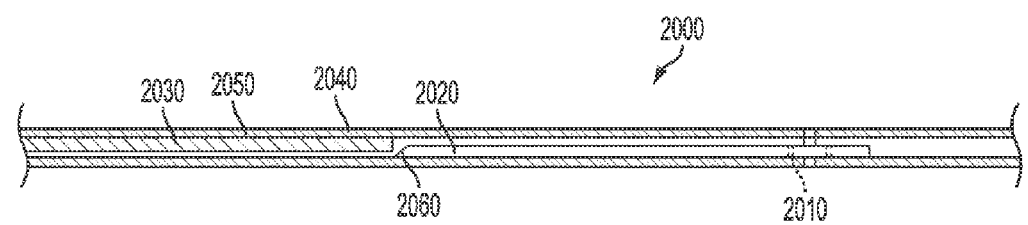
Figure 20C:
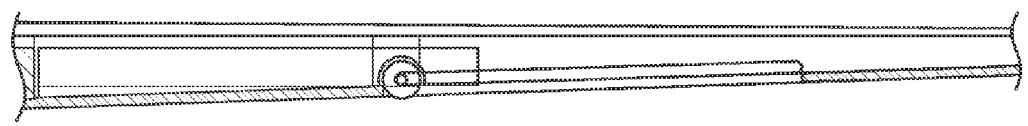
FIG. 20c illustrates a side view of the roll and translate actuator assembly of FIG. 20a when compressed.

FIG. 20a illustrates a side view of an embodiment of roll and translate actuator 2000 with horizontal compression of reservoir 2030. Roll and translate actuator 2000 includes wheel 2010, slider 2020, reservoir 2030, and temple chassis 2040. In roll and translate actuator 2000, wheel 2010 translates along temple chassis 2040. Slider 2020 slides with wheel 2010 and compresses reservoir 2030 against a vertical inner side surface 2050 of temple chassis 2040. In an embodiment, slider 2020 includes a wedge 2060 to facilitate the horizontal compression of reservoir 2030. FIG. 20b illustrates a top view of the roll and translate actuator of FIG. 20a. FIG. 20c illustrates a side view of the roll and translate actuator of FIG. 20c when compressed.

Figure 21A:
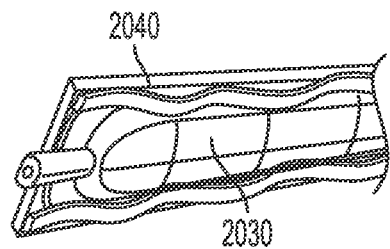
FIG. 21a illustrates a side perspective view of an embodiment of a reservoir.
Figure 21B:
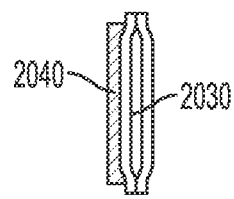
FIG. 21b illustrates a front view of an embodiment of a reservoir.
Figure 21C:
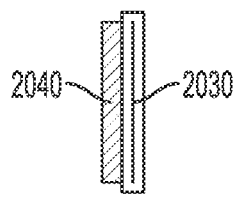
FIG. 21c illustrates a front view of an embodiment of a reservoir when compressed.

FIG. 21a is a side perspective view of reservoir 2030 of FIG. 20a. FIG. 21b illustrates a front view of reservoir 2030 of FIG. 20a. FIG. 21c illustrates a front view of reservoir 2030 when horizontally compressed.

Figure 22A:
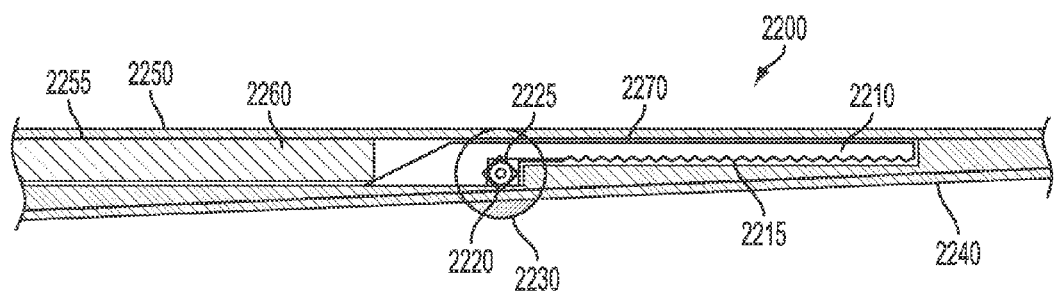
FIG. 22a illustrates a side view of an embodiment of a rack and pinion actuator assembly.
Figure 22B:
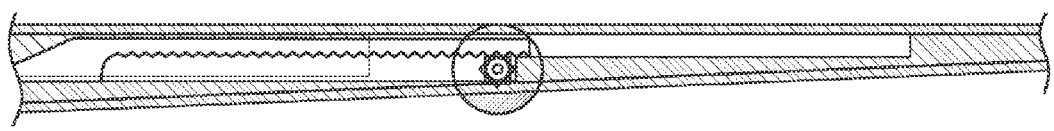
FIG. 22b illustrates a side view of the rack and pinion actuator assembly of FIG. 22a when compressed.

FIG. 22a illustrates a front view of an embodiment of a rack and pinion actuator assembly 2200, according to an embodiment of the present invention. Rack and pinion actuator assembly 2200 includes slider bar 2270, rack portion 2210 of slider bar 2270, pinion 2220, wheel 2230, temple cover 2240, and reservoir 2260. Wheel 2230 and pinion 2220 are coupled together so that when wheel 2230 is rotated, pinion 2220 is also rotated. Teeth 2225 of pinion 2220 engage with teeth 2215 of rack portion 2210 of slider bar 2270. As a result, when wheel 2230 is rotated, slider bar 2270 moves to compress reservoir 2260 against temple chassis ceiling 2255 of temple chassis 2250. FIG. 22b illustrates a side view of the rack and pinion actuator assembly of FIG. 22a when compressed.

Figure 23A:
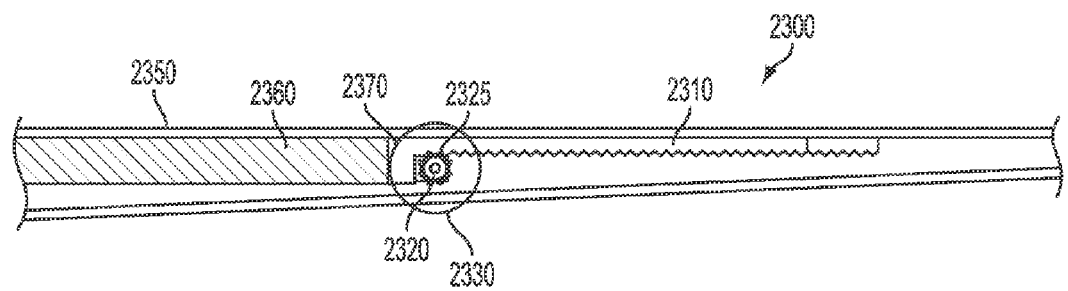
FIG. 23a illustrates a side view of an embodiment of a rack and pinion actuator assembly.
Figure 23B:
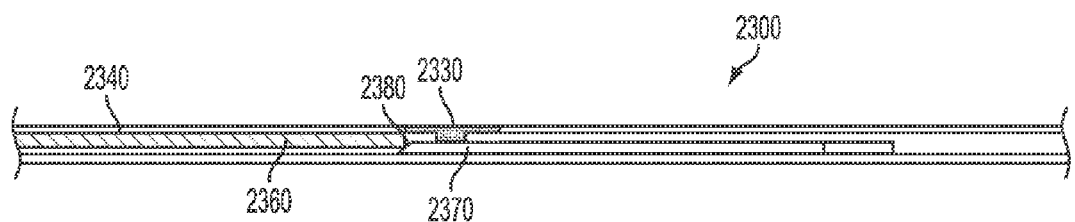
Figure 23C:
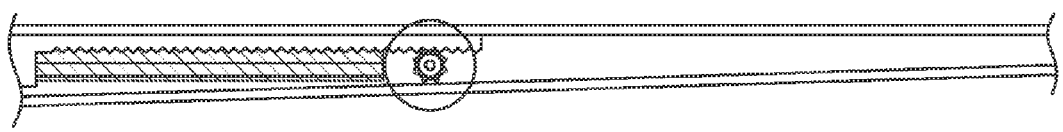

FIGS. 23a-c and 24 illustrate an embodiment of rack and pinion actuator assembly 2300 with horizontal compression of reservoir 2360. FIG. 23a illustrates a side view of rack and pinion actuator assembly 2300. Wheel 2330 and pinion 2320 are coupled together so that when wheel 2330 is rotated, pinion 2320 is also rotated. Teeth 2325 of pinion 2320 engage with teeth 2310 of slider bar 2370. When wheel 2330 of rack and pinion actuator assembly 2300 is rotated, slider bar 2370 compresses reservoir 2360 against a vertical inner side surface 2340 of temple chassis 2350. In an embodiment, slider bar 2370 includes a wedge 2380 to facilitate the horizontal compression of reservoir 2030. FIG. 23b illustrates a top view of the rack and pinion actuator assembly of FIG. 23a. FIG. 23c illustrates a side view of the rack and pinion actuator assembly of FIG. 23a when compressed.

Figure 24:
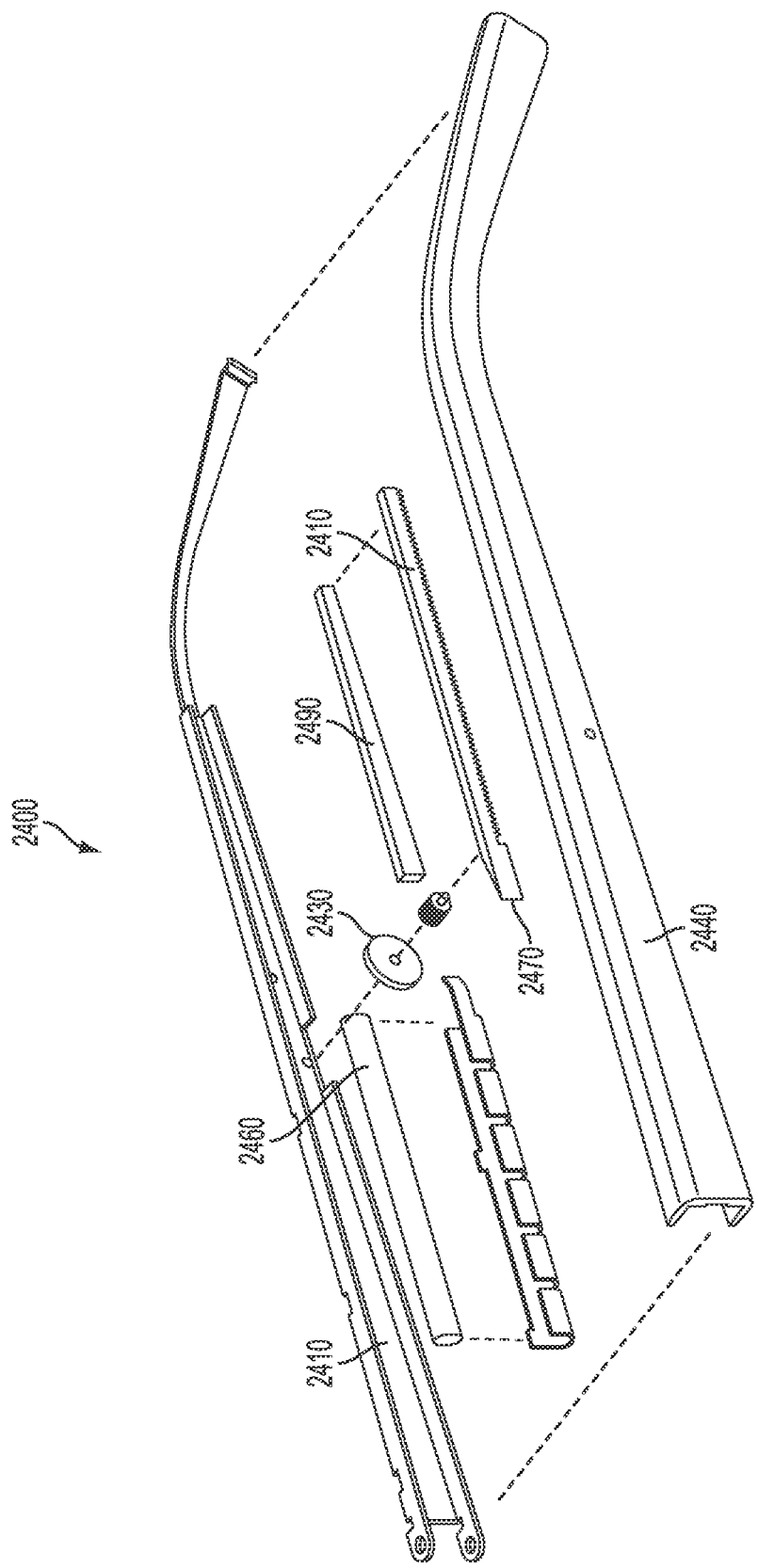
FIG. 24 illustrates a front perspective exploded view of an embodiment of a rack and pinion actuator assembly.

FIG. 24 illustrates a perspective exploded view of an embodiment of rack and pinion actuator assembly 2400. When wheel 2430 of rack and pinion actuator assembly 2400 is rotated, slider bar 2470 pushes stiff plate 2490. Reservoir 2460 is placed between stiff plate 2490 and inner wall 2410 of temple cover 2440 so that reservoir 2460 is compressed when wheel 2430 is rotated.

Figure 25:
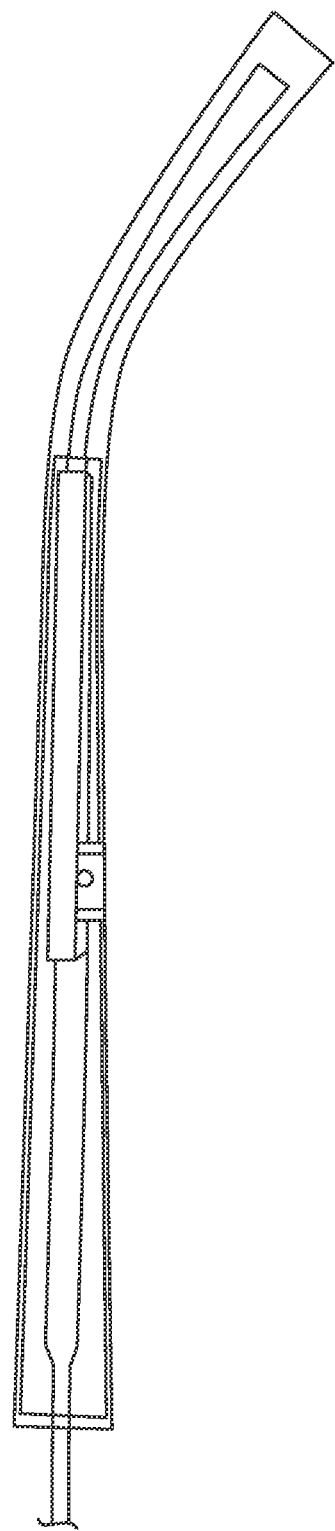
FIG. 25 shows an embodiment of a rack and pinion actuator assembly.
Figure 26:
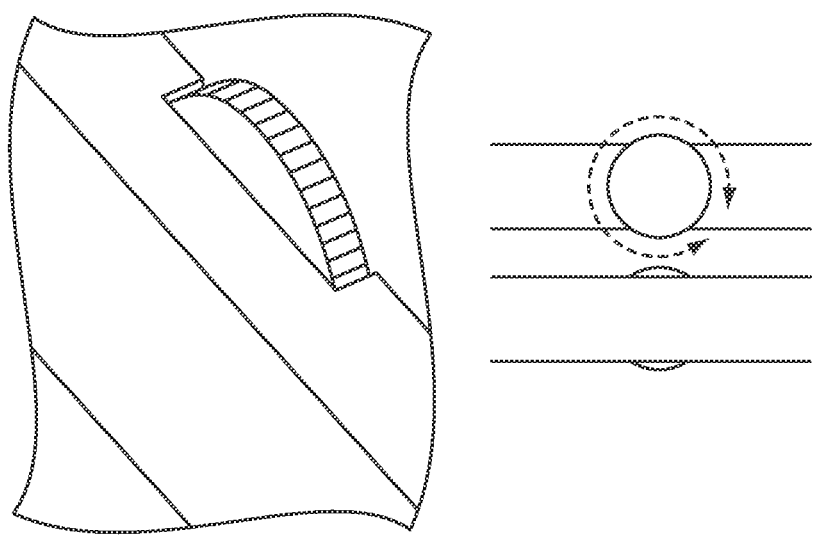
FIG. 26 illustrates a portion of an embodiment of a rack and pinion actuator assembly.

FIG. 25 shows an embodiment of a rack and pinion actuator assembly. FIG. 26 illustrates a portion of an embodiment of a temple including a rack and pinion actuator showing the rotation of the wheel relative to the temple cover, according to an embodiment.

Figure 27A:
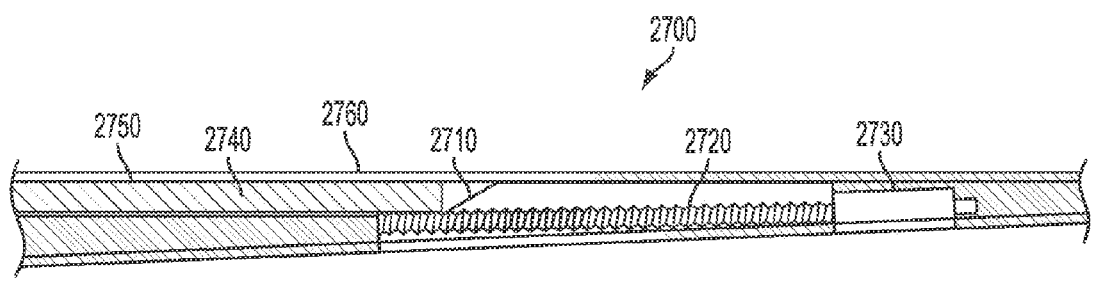
FIG. 27a illustrates a side view of an embodiment of a screw actuator assembly.
Figure 27B:
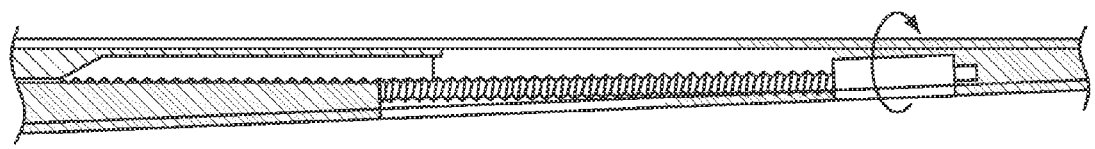
FIG. 27b illustrates a side view of an embodiment of a screw actuator assembly when compressed.

FIG. 27a illustrates a side view of screw actuator assembly 2700 with vertical compression of reservoir 2740. Slider bar 2710 works in a similar way to the slider bars of previous embodiments. However, instead of a rack and pinion or other arrangement, screw actuator assembly 2700 provides for a worm gear arrangement between screw 2720 and slider bar 2710. When screw 2720 is rotated by rotation of dial 2730 by a user, slider bar 2710 moves to compress reservoir 2740 against temple chassis ceiling 2750 of temple chassis 2760. FIG. 27b illustrates a side view of the screw actuator assembly of FIG. 27a when compressed.

Figure 28A:
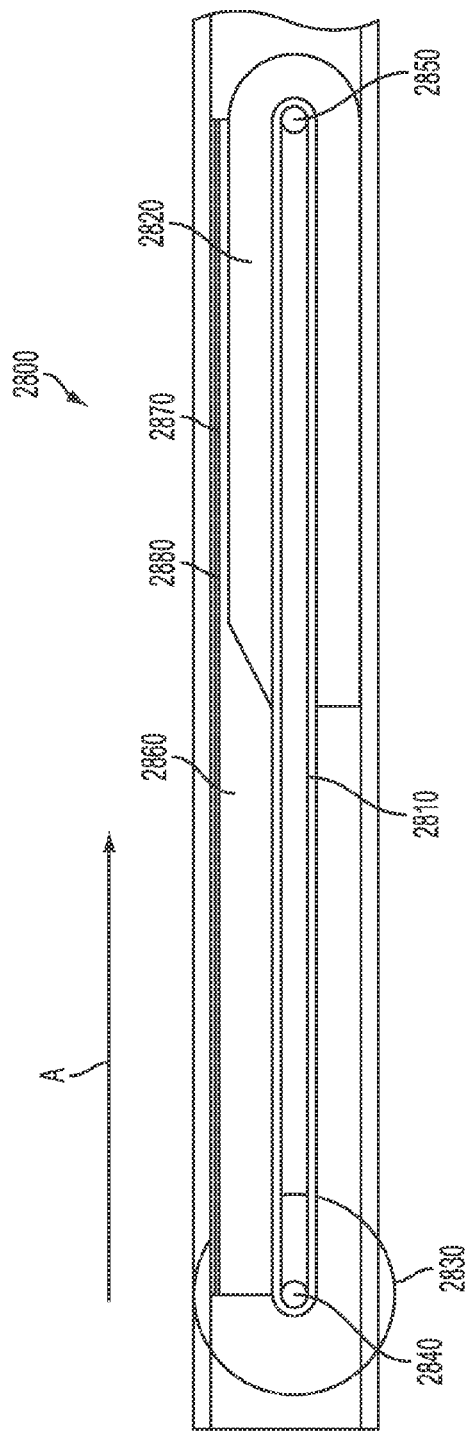
FIG. 28a illustrates a side view of an embodiment of a rotation actuator assembly when partially compressed.
Figure 28B:
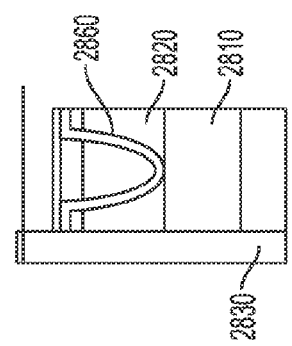
FIG. 28b illustrates a view of an embodiment of the rotation actuator assembly of FIG. 28a along line A.

FIG. 28a illustrates a side view of an embodiment of rotation actuator assembly 2800 with a pulley-type track 2810 with vertical compression of reservoir 2860. Slider bar 2820 works in a similar way to the slider bars of previous embodiments, except it is adhered to track 2810. When wheel 2830 is rotated, it moves track 2810 around pulleys 2840 and 2850. When track 2810 moves around pulleys 2840 and 2850, slider bar 2820 moves to compress reservoir 2860 against temple chassis ceiling 2880 of temple chassis 2870. In an embodiment, as shown in FIG. 28a, slider bar 2820 is configured to bend around pulley 2850. FIG. 28b is a view of the screw actuator assembly along line A of FIG. 28a.

Figure 29A:
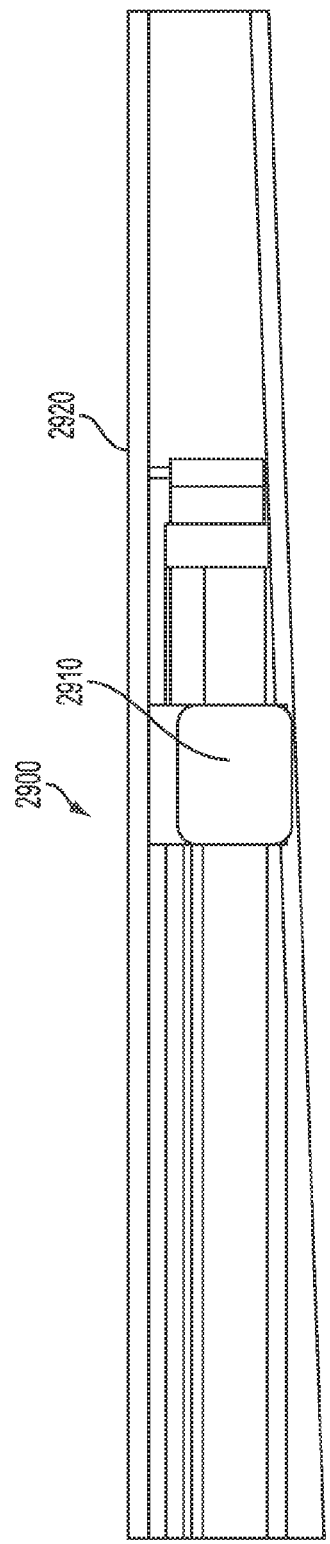
FIG. 29a illustrates a side view of an embodiment of a slide and translate actuator assembly.
Figure 29B:
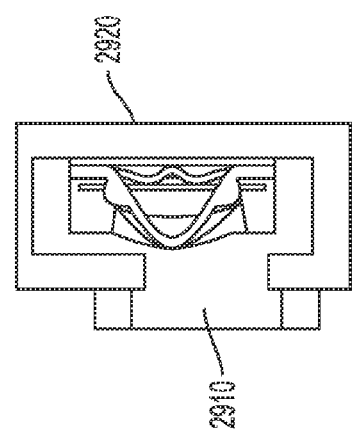
FIG. 29b illustrates a front sectional view of an embodiment of a slide and translate actuator assembly.

FIG. 29a illustrates a side view of an embodiment of slide and translate actuator 2900 with horizontal compression of its reservoir (not shown). When slider button 2910 is translated along temple arm 2920, the slider bar (not shown) moves to compress the reservoir against the temple chassis. FIG. 29b is a sectional view of the actuator assembly along an axis of temple arm 2920. Specifically, FIG. 29b is a sectional view of the slider compressing the reservoir as it translates along the axis of the temple arm.

Although various embodiments of the present invention have been described above, it should be understood that they have been presented by way of example only, and not limitation. It will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the following claims and their equivalents.

Further, the purpose of the foregoing Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract is not intended to be limiting as to the scope of the present invention in any way.

We claim:

1. An actuator for a sealed fluid-filled lens comprising:
a housing;
a reservoir disposed within the housing;
a compression arm having a first end that is fixed and a second end that is not fixed,
wherein the compression arm is disposed adjacent to the reservoir, and
wherein said compression arm flexes to compress the reservoir; and
a slider slidingly disposed within the housing and disposed adjacent to the compression arm,
wherein sliding the slider from the first end of the compression arm to the second end of the compression arm causes the slider to push the second end of the compression arm so as to compress the reservoir.

2. The actuator of claim 1, wherein the housing comprises a temple chassis and temple cover.

3. The actuator of claim 1, further comprising a wheel attached to the slider.

4. The actuator of claim 3, wherein the wheel is rotatably attached to the slider and wherein rotation of the wheel causes the slider to slide.

5. The actuator of claim 3, wherein translation of the wheel causes the slider to slide.

6. The actuator of claim 1, wherein the first end of the compression arm is distal to a fluid lens attached to the actuator.

7. An actuator for a sealed fluid-filled lens comprising:
a housing;
a reservoir disposed within the housing; and
a compression arm having a first end that is fixed and a second end that is not fixed,
wherein the compression arm is disposed adjacent to the reservoir,
wherein said compression arm flexes to compress the reservoir,
wherein the compression arm compresses the reservoir against a vertical surface of the housing, and
wherein the compression arm compresses the reservoir against a horizontal surface of the housing.

8. An actuator for a fluid-filled lens comprising: a housing having a first end and a second end; a reservoir disposed within the housing; and a slider slidingly disposed within the housing and disposed adjacent to the reservoir, wherein the slider includes a first end having a wedge shape configured to compress the reservoir, and wherein sliding of the slider from the second end of the housing to the first end of the housing causes the first end of the slider to compress the reservoir.

9. The actuator of claim 8, further comprising a wheel attached to the slider.

10. The actuator of claim 9, wherein the wheel is rotatably attached to the slider and wherein rotation of the wheel causes the slider to slide.

11. The actuator of claim 9, wherein translation of the wheel causes the slider to slide.

12. The actuator of claim 8, wherein the slider compresses the reservoir against a vertical surface of the housing.

13. The actuator of claim 8, wherein the slider compresses the reservoir against a horizontal surface of the housing.

14. The actuator of claim 8, further comprising: a pinion; and a rack connected to the slider, wherein rotation of the pinion causes teeth on the pinion to engage with and push teeth of the rack so as to move the slider.

15. The actuator of claim 8, further comprising: a screw having an axis of rotation collinear with a line formed between the first and second ends of the housing; and a rack connected to the slider, wherein rotation of the screw causes teeth on the screw to engage with and push teeth of the rack so as to move the slide.

16. The actuator of claim 8, further comprising a pulley arrangement to slide the slider.

* * * * *